(12) United States Patent
Murata et al.

(10) Patent No.: US 11,438,721 B2
(45) Date of Patent: Sep. 6, 2022

(54) OUT-OF-HEAD LOCALIZATION SYSTEM, FILTER GENERATION DEVICE, METHOD, AND PROGRAM

(71) Applicant: JVCKENWOOD Corporation, Yokohama (JP)

(72) Inventors: Hisako Murata, Yokohama (JP); Masaya Konishi, Yokohama (JP); Yumi Fujii, Yokohama (JP); Takahiro Gejo, Yokohama (JP); Kuniaki Takachi, Yokohama (JP); Toshiaki Nagai, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 17/200,708

(22) Filed: Mar. 12, 2021

(65) Prior Publication Data
US 2021/0204084 A1 Jul. 1, 2021

Related U.S. Application Data

(63) Continuation of application No. PCT/JP2019/036076, filed on Sep. 13, 2019.

(30) Foreign Application Priority Data

Sep. 28, 2018 (JP) .............................. JP2018-183579

(51) Int. Cl.
*H04S 7/00* (2006.01)
*H04S 5/00* (2006.01)
*G06F 3/16* (2006.01)

(52) U.S. Cl.
CPC .............. *H04S 7/302* (2013.01); *G06F 3/165* (2013.01); *H04S 5/00* (2013.01)

(58) Field of Classification Search
None
See application file for complete search history.

(56) References Cited

U.S. PATENT DOCUMENTS

2009/0296949 A1* 12/2009 Iwata .................... G10K 11/175
381/71.6
2010/0150355 A1  6/2010 Kon et al.
(Continued)

FOREIGN PATENT DOCUMENTS

JP          2001285998 A  * 10/2001
JP          2010-147529 A    7/2010
(Continued)

*Primary Examiner* — James K Mooney
(74) *Attorney, Agent, or Firm* — Procopio, Cory, Hargreaves & Savitch LLP

(57) ABSTRACT

To provide an out-of-head localization system, a filter generation device, a method, and a program capable of appropriate processing, an out-of-head localization system according to this embodiment includes a measurement device that measures transfer characteristics by using a microphone worn on a user's ear before the user U sits on a seat, an out-of-head localization device that is installed in the seat and performs out-of-head localization by using a filter appropriate to the transfer characteristics, and a server terminal that transmits the filter appropriate to the transfer characteristics to the out-of-head localization device on the basis of identification information of the user U.

8 Claims, 14 Drawing Sheets

(56) References Cited

U.S. PATENT DOCUMENTS

2010/0241256 A1* 9/2010 Goldstein ................ H04R 5/04
700/94
2018/0206058 A1 7/2018 Murata et al.

FOREIGN PATENT DOCUMENTS

JP 2017-028525 A 2/2017
WO 2017-046984 A 3/2017

* cited by examiner

| EAR | SET | FIRST CHARACTERISTIC DATA | | SECOND CHARACTERISTIC DATA |
|---|---|---|---|---|
| LEFT EAR | 1 | Hls_DB1 | Hro_DB1 | ECTFL_DB1 |
| | 2 | Hls_DB2 | Hro_DB2 | ECTFL_DB2 |
| | ⋮ | | | |
| | N | Hls_DBN | Hro_DBN | ECTFL_DBN |
| RIGHT EAR | 1 | Hrs_DB1 | Hlo_DB1 | ECTFR_DB1 |
| | 2 | Hrs_DB2 | Hlo_DB2 | ECTFR_DB2 |
| | ⋮ | | | |
| | N | Hrs_DBN | Hlo_DBN | ECTFR_DBN |

Fig. 9

OUT-OF-HEAD LOCALIZATION SYSTEM, FILTER GENERATION DEVICE, METHOD, AND PROGRAM

CROSS REFERENCE TO RELATED APPLICATIONS

This application is a Bypass Continuation of PCT/JP2019/036076, filed on Sep. 13, 2019, which is based upon and claims the benefit of priority from Japanese patent application No. 2018-183579, filed on Sep. 28, 2018, the disclosure of which is incorporated herein in its entirety by reference.

BACKGROUND

The present disclosure relates to an out-of-head localization system, a filter generation device, a method, and a program.

Patent Literature 1 (Japanese Unexamined Patent Application Publication No. 2010-147529) discloses a system that controls sound localization when listening to a sound by earphones or headphones while viewing an image on a display device. The system of Patent Literature 1 uses a filter that convolves an impulse response obtained by converting a transfer function from a speaker to both ears into time domain. Further, an adder circuit is mounted for each of the left and right outputs of earphones or headphones. The adder circuit adds sound signals from a digital filter. The sound signal from the adder circuit is converted into an analog signal by a DAC (Digital to Analog Converter). The converted sound signal is supplied to a transducer through an amplifier circuit. Further, Patent Literature 1 controls a sound localization position depending on the moving distance and the rotation of a display or a listener's head.

Sound localization techniques include an out-of-head localization technique, which localizes sound images outside the head of a listener by using headphones. The out-of-head localization technique localizes sound images outside the head by canceling out characteristics from the headphones to the ears and giving four characteristics (spatial acoustic transfer characteristics) from stereo speakers to the ears.

In out-of-head localization reproduction, measurement signals (impulse sounds etc.) that are output from 2-channel (which is referred to hereinafter as "ch") speakers are recorded by microphones (which can be also called "mike") placed on the ears of a listener. Then, a processing device generates filters on the basis of characteristics (which are also referred to as spatial acoustic transfer characteristics, spatial acoustic transfer function, head-related transfer function HRTF, etc.) from the speakers to the microphones and spatial acoustic transfer characteristics obtained by collecting measurement signals. The out-of-head localization device convolves the filter to 2-ch audio signals.

Further, in order to generate filters that cancel out characteristics from headphones to the ears, characteristics from headphones to the ears or eardrums (ear canal transfer function ECTF; also referred to as ear canal transfer characteristics) are measured by the microphones placed in the ears of the listener.

SUMMARY

When performing out-of-head localization, it is preferred to measure characteristics with microphones placed in the ears of the listener. However, it is difficult to appropriately put microphones in the ears of the listener. Further, a measurement position to measure the spatial acoustic transfer characteristics from speakers to the microphone is limited. On the other hand, when using characteristics of those other than the listener, there is a possibility that out-of-head localization is not done appropriately. Particularly, since the shape of the ear canal is different from person to person or from ear to ear, if a filter appropriate to the ear canal transfer characteristics of another person is used, processing is not done appropriately in some cases.

The present embodiment has been accomplished to solve the above problems and an object of the present invention is thus to provide an out-of-head localization device, a processing method, and a program capable of appropriate processing.

An out-of-head localization system according to this embodiment includes a measurement device configured to measure transfer characteristics by using a microphone worn on a user's ear before the user sits on a seat, an out-of-head localization device configured to perform out-of-head localization by using a filter appropriate to the transfer characteristics, and a server configured to transmit the filter appropriate to the transfer characteristics to the out-of-head localization device on the basis of identification information of the user.

An out-of-head localization method according to this embodiment includes a step of measuring transfer characteristics by using a microphone worn on a user's ear before the user seats on a seat, a step of transmitting a filter appropriate to the transfer characteristics to an out-of-head localization device on the basis of identification information of the user, a step of performing, by an out-of-head localization device, out-of-head localization using the filter on a reproduction signal, and a step of outputting the reproduction signal on which the out-of-head localization is performed from headphones or earphones to the user corresponding to the identification information.

A filter generation device according to this embodiment includes an ear canal transfer characteristic acquisition unit configured to acquire ear canal transfer characteristics from headphones or earphones worn on a user to a microphone, a first selection unit configured to, by referring to a database storing a plurality of sets of first characteristic data corresponding to spatial acoustic transfer characteristics from a speaker to the microphone and second characteristic data corresponding to the ear canal transfer characteristics, select a first set on the basis of a frequency response in a first frequency band of the ear canal transfer characteristics of the user, a first acquisition unit configured to acquire the second characteristic data contained in the first set selected by the first selection unit, a second selection unit configured to, by referring to the database, select a second set on the basis of a frequency response in a second frequency band of the ear canal transfer characteristics of the user, a second acquisition unit configured to acquire the second characteristic data contained in the second set selected by the second selection unit, a third acquisition unit configured to acquire preset data set in advance, and a filter generation unit configured to generate a filter appropriate to spatial acoustic transfer characteristics of the user on the basis of the second characteristic data in the first set, the second characteristic data in the second set, and the preset data.

A filter generation method according to this embodiment includes a step of acquiring ear canal transfer characteristics from headphones or earphones worn on a user to a microphone, a step of referring to a database storing a plurality of sets of first characteristic data corresponding to spatial acoustic transfer characteristics from a speaker to the microphone and second characteristic data corresponding to the ear canal transfer characteristics, and selecting a first set on the basis of a frequency response in a first frequency band of the ear canal transfer characteristics of the user, a step of acquiring the second characteristic data contained in the first set, a step of referring to the database and selecting a second set on the basis of a frequency response in a second frequency band of the ear canal transfer characteristics of the user, a step of acquiring the second characteristic data contained in the second set, a step of acquiring preset data set in advance, and a step of generating a filter appropriate to spatial acoustic transfer characteristics of the user on the basis of the second characteristic data in the first set, the second characteristic data in the second set, and the preset data.

According to the embodiment, there are provided an out-of-head localization system, a filter generation device, a method, and a program capable of appropriate processing.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 9 is a table showing first and second characteristic data stored in a database.

DESCRIPTION OF EMBODIMENTS

The overview of a sound localization process according to an embodiment is described hereinafter. An out-of-head localization process according to this embodiment performs out-of-head localization by using spatial acoustic transfer characteristics and ear canal transfer characteristics. The spatial acoustic transfer characteristics are transfer characteristics from a sound source such as speakers to the ear canal. The ear canal transfer characteristics are transfer characteristics from a headphone or earphone speaker unit to the eardrum. This embodiment enables out-of-head localization to be performed by using a filter appropriate to the spatial sound transfer characteristics measured when headphones or earphones are not worn. It also enables out-of-head localization to be performed by using a filter appropriate to the ear canal transfer characteristics measured when headphones or earphones are worn.

The out-of-head localization process according to this embodiment is performed by a user terminal such as a personal computer, a smart phone, or a tablet PC. Further, a user terminal that performs the out-of-head localization may be a reproduction device that is mounted on a vehicle such as an aircraft, a train (railway vehicle), a ship or a bus. In this case, a passenger who sits in a passenger seat of the vehicle performs out-of-head localization listening. The user terminal is an information processor including a processing means such as a processor, a storage means such as a memory or a hard disk, a display means such as a liquid crystal monitor, and an input means such as a touch panel, a button, a keyboard and a mouse. The user terminal may have a communication function to transmit and receive data. Further, an output means (output unit) with headphones or earphones is connected to the user terminal. Although an example of using headphones is described below, earphones may be used instead of headphones.

First Embodiment (Out-Of-Head Localization Device)

Figure 1:
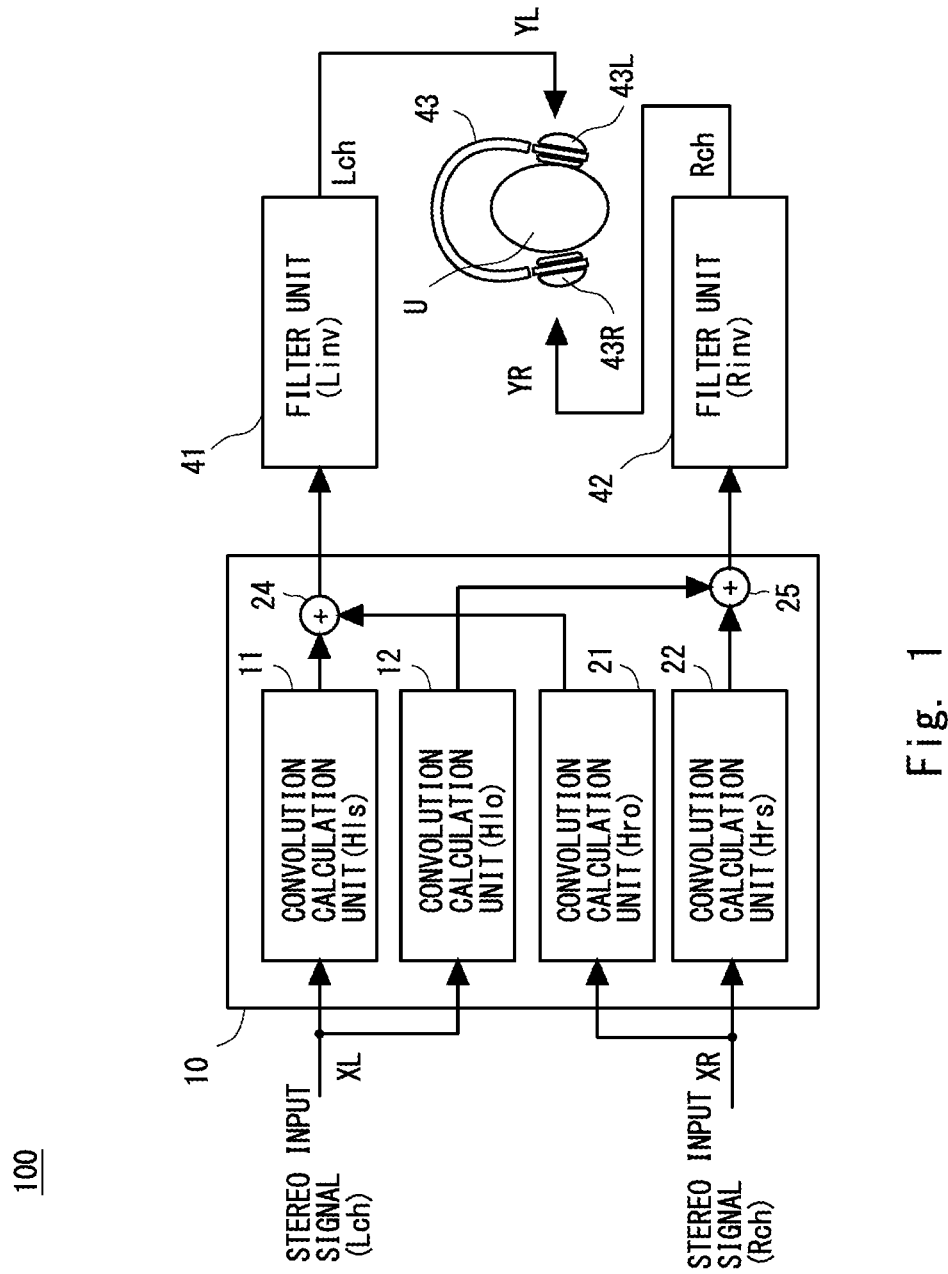
FIG. 1 is a block diagram showing an out-of-head localization device according to an embodiment.

FIG. 1 shows an out-of-head localization device 100, which is an example of a sound field reproduction device according to this embodiment. FIG. 1 is a block diagram of the out-of-head localization device 100. The out-of-head localization device 100 reproduces a sound field for a user U who is wearing headphones 43. Thus, the out-of-head localization device 100 performs sound localization for L-ch and R-ch stereo input signals XL and XR. The L-ch and R-ch stereo input signals XL and XR are analog audio reproduction signals that are output from a CD (Compact Disc) player or the like or digital audio data such as mp3 (MPEG Audio Layer-3). Note that the audio reproduction signals or the digital audio data are collectively referred to as reproduction signals. Thus, the L-ch and R-ch stereo input signals XL and XR are the reproduction signals.

Note that the out-of-head localization device 100 is not limited to a physically single device, and a part of processing may be performed in a different device. For example, a part of processing may be performed by a smartphone or the like, and the rest of processing may be performed by a DSP (Digital Signal Processor) or the like built in the headphones 43.

The out-of-head localization device 100 includes an out-of-head localization unit 10, a filter unit 41, a filter unit 42, and headphones 43. The out-of-head localization unit 10, the filter unit 41 and the filter unit 42 can be implemented by a processor or the like, to be specific.

The out-of-head localization unit 10 includes convolution calculation units 11 to 12 and 21 to 22 and adders 24 and 25. The convolution calculation units 11 to 12 and 21 to 22 perform convolution processing using the spatial acoustic transfer characteristics. The stereo input signals XL and XR from a CD player or the like are input to the out-of-head localization unit 10. The spatial acoustic transfer characteristics are set to the out-of-head localization unit 10. The out-of-head localization unit 10 convolves a filter of the spatial acoustic transfer characteristics (which is referred hereinafter also as a spatial acoustic filter) into each of the stereo input signals XL and XR having the respective channels. The spatial acoustic transfer characteristics may be a head-related transfer function HRTF measured in the head or auricle of a person being measured, or may be the head-related transfer function of a dummy head or a third person.

The spatial acoustic transfer characteristics are a set of four spatial acoustic transfer characteristics Hls, Hlo, Hro and Hrs. Data used for convolution in the convolution calculation units 11 to 12 and 21 to 22 is a spatial acoustic filter. The spatial acoustic filter is generated by cutting out the spatial acoustic transfer characteristics Hls, Hlo, Hro and Hrs with a specified filter length.

Each of the spatial acoustic transfer characteristics Hls, Hlo, Hro and Hrs is acquired in advance by impulse response measurement or the like. For example, the user U wears microphones on the left and right ears, respectively. Left and right speakers placed in front of the user U output impulse sounds for performing impulse response measurement. Then, the microphones pick up measurement signals such as the impulse sounds output from the speakers. The spatial acoustic transfer characteristics Hls, Hlo, Hro and Hrs are acquired on the basis of sound pickup signals in the microphones. The spatial acoustic transfer characteristics Hls between the left speaker and the left microphone, the spatial acoustic transfer characteristics Hlo between the left speaker and the right microphone, the spatial acoustic transfer characteristics Hro between the right speaker and the left microphone, and the spatial acoustic transfer characteristics Hrs between the right speaker and the right microphone are measured.

The convolution calculation unit 11 then convolves the spatial acoustic filter appropriate to the spatial acoustic transfer characteristics Hls to the L-ch stereo input signal XL. The convolution calculation unit 11 outputs convolution calculation data to the adder 24. The convolution calculation unit 21 convolves the spatial acoustic filter appropriate to the spatial acoustic transfer characteristics Hro to the R-ch stereo input signal XR. The convolution calculation unit 21 outputs convolution calculation data to the adder 24. The adder 24 adds the two convolution calculation data and outputs the data to the filter unit 41.

The convolution calculation unit 12 convolves the spatial acoustic filter appropriate to the spatial acoustic transfer characteristics Hlo to the L-ch stereo input signal XL. The convolution calculation unit 12 outputs convolution calculation data to the adder 25. The convolution calculation unit 22 convolves the spatial acoustic filter appropriate to the spatial acoustic transfer characteristics Hrs to the R-ch stereo input signal XR. The convolution calculation unit 22 outputs convolution calculation data to the adder 25. The adder 25 adds the two convolution calculation data and outputs the data to the filter unit 42.

Inverse filters Linv and Rinv that cancel out the headphone characteristics (characteristics between a reproduction unit of headphones and a microphone) are set to the filter units 41 and 42, respectively. Then, the inverse filters Linv and Rinv are convolved to the reproduction signals (convolution calculation signals) on which processing in the out-of-head localization unit 10 is performed. The filter unit 41 convolves the inverse filter Linv with the L-ch headphone characteristics to the L-ch signal from the adder 24. Likewise, the filter unit 42 convolves the inverse filter Rinv with the R-ch headphone characteristics to the R-ch signal from the adder 25. The inverse filters Linv and Rinv cancel out the characteristics from the headphone unit to the microphone when the headphones 43 are worn. The microphone may be placed at any position between the entrance of the ear canal and the eardrum.

The filter unit 41 outputs a processed L-ch signal YL to a left unit 43L of the headphones 43. The filter unit 42 outputs a processed R-ch signal YR to a right unit 43R of the headphones 43. The user U is wearing the headphones 43. The headphones 43 output the L-ch signal YL and the R-ch signal YR (the L-ch signal YL and the R-ch signal YR are hereinafter referred to collectively as stereo signals) toward the user U. This enables reproduction of sound images localized outside the head of the user U.

As described above, the out-of-head localization device 100 performs out-of-head localization by using the spatial acoustic filters appropriate to the spatial acoustic transfer characteristics Hls, Hlo, Hro and Hrs and the inverse filters Linv and Rinv with the headphone characteristics. In the following description, the spatial acoustic filters appropriate to the spatial acoustic transfer characteristics Hls, Hlo, Hro and Hrs and the inverse filters Linv and Rinv with the headphone characteristics are referred to collectively as out-of-head localization filters. In the case of 2ch stereo reproduction signals, the out-of-head localization filters are made up of four spatial acoustic filters and two inverse filters. The out-of-head localization device 100 then carries out convolution calculation on the stereo reproduction signals by using the total six out-of-head localization filters and thereby performs out-of-head localization. The out-of-head localization filters are preferably based on measurement of the individual user U. For example, the out-of-head localization filters are set on the basis of sound pickup signals picked up by the microphones worn on the ears of the user U. Note that, in order to save memory, filters may be computed into four filters.

As described above, the spatial acoustic filters and the inverse filters of the headphone characteristics are filters for audio signals. Those filters are convolved to the reproduction signals (stereo input signals XL and XR), and thereby the out-of-head localization device 100 carries out out-of-head localization. Thus, the out-of-head localization device 100 serves as a reproduction device that reproduces a sound field where a sound image is localized at an out-of-head position.

(Measurement Device)

Figure 2:
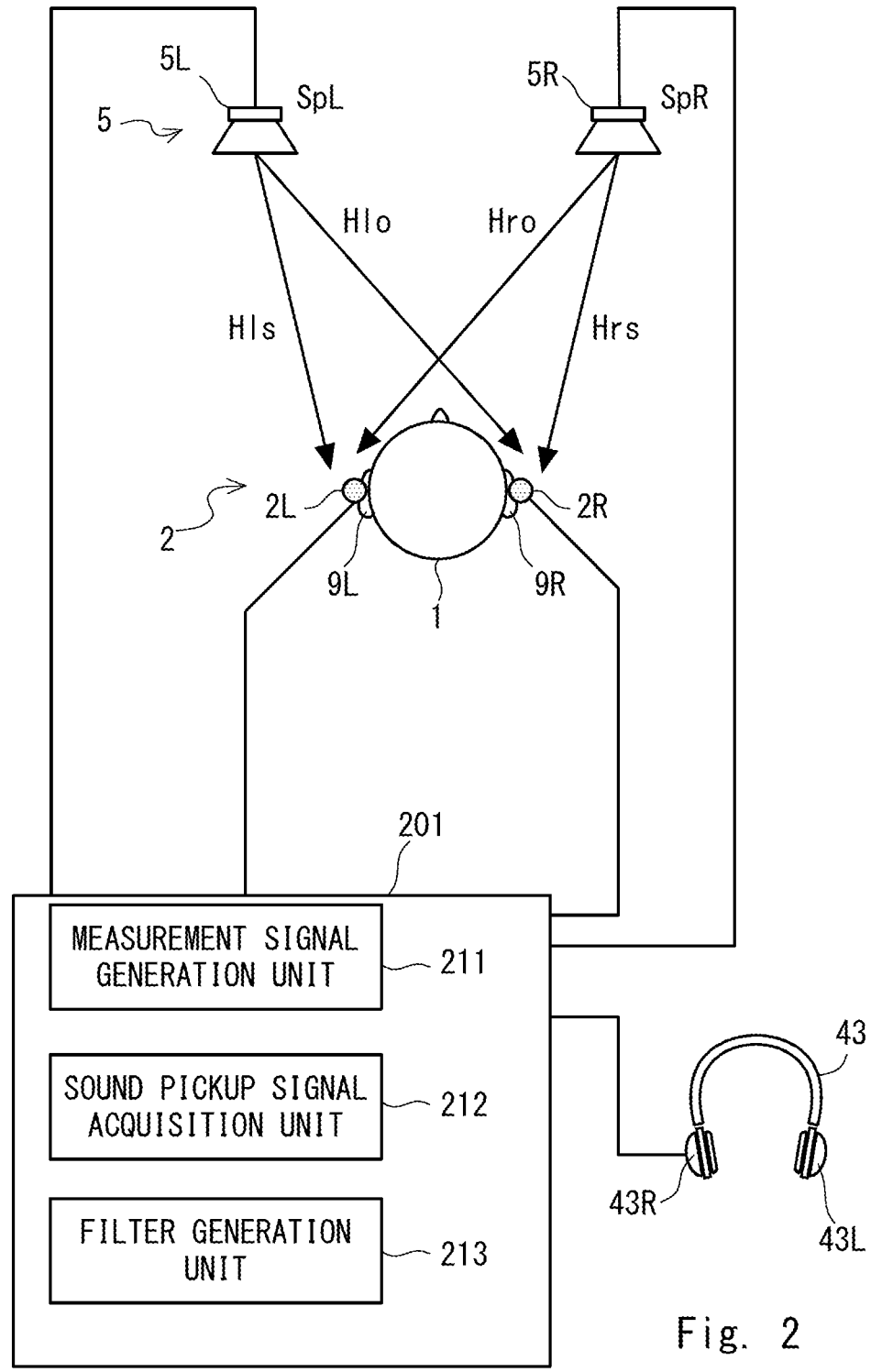
FIG. 2 is a schematic view showing a measurement device for measuring ear canal transfer characteristics.

A measurement device that measures transfer characteristics is described hereinafter with reference to FIG. 2. FIG. 2 is view showing the measurement structure of a measurement device 200. The measurement device 200 may be a common device to the out-of-head localization device 100 shown in FIG. 1. Alternatively, a part or the whole of the measurement device 200 may be a different device from the out-of-head localization device 100.

As shown in FIG. 2, the measurement device 200 includes a stereo speaker 5, a stereo microphone 2, headphones 43, and a processing device 201. The stereo speaker 5 is installed in a measurement environment. The measurement environment may be a room of a person 1 being measured at home, a dealer or showroom of an audio system or the like. Further, the measurement environment may be installed in various facilities used when boarding a vehicle, such as an airport, a station, a port, or a bus terminal.

In this embodiment, the processing device 201 of the measurement device 200 performs processing for appropriately generating out-of-head localization filters depending on measurement results. The processing device 201 includes a measurement signal generation unit 211, a sound pickup signal acquisition unit 212, and a filter generation unit 213. The processing device 201 is a personal computer (PC), a tablet terminal, a smartphone or the like, and it includes a memory and a CPU. The memory stores a processing program, parameters, measurement data and the like. The CPU executes the processing program stored in the memory. As a result that the CPU executes the processing program, processing in the measurement signal generation unit 211, the sound pickup signal acquisition unit 212, and the filter generation unit 213 are performed.

The measurement signal generation unit 211 generates a measurement signal for measuring the ear canal transfer characteristics or the spatial acoustic transfer characteristics. The measurement signal is an impulse signal, a TSP (Time Stretched Pule) signal or the like, for example. In this example, the measurement device 200 performs impulse response measurement by using impulse sounds as the measurement signal.

When measuring the spatial acoustic transfer characteristics Hls, Hlo, Hro and Hrs, the measurement device 200 performs measurement using the stereo speaker 5. Specifically, the person 1 being measured wears only the stereo microphone 2 without wearing the headphones 43. Then, a measurement signal is output from the stereo speaker 5, and this measurement signal is picked up by the stereo microphone 2. The headphones 43 are not used when measuring the spatial acoustic transfer characteristics Hls, Hlo, Hro and Hrs.

When measuring the ear canal transfer characteristics, the measurement device 200 performs measurement using the headphones 43. Specifically, the person 1 being measured wears the stereo microphone 2 and the headphones 43. Then, a measurement signal is output from the headphones 43, and this measurement signal is picked up by the stereo microphone 2. The stereo speaker 5 is not used when measuring the ear canal transfer characteristics.

First, measurement of the spatial acoustic transfer characteristics Hls, Hlo, Hro and Hrs (which are hereinafter referred to also simply as transfer characteristics Hls, Hlo, Hro and Hrs) and generation of the spatial acoustic filters are described. The stereo speaker 5 includes a left speaker 5L and a right speaker 5R. For example, the left speaker 5L and the right speaker 5R are placed in front of the person 1 being measured. The left speaker 5L and the right speaker 5R output a measurement signal for performing impulse response measurement. Although the number of speakers, which serve as sound sources, is 2 (stereo speakers) in this embodiment, the number of sound sources to be used for measurement is not limited to 2, and it may be 1 or more. Therefore, this embodiment is applicable also to 1ch mono or 5.1ch, 7.1ch etc. multichannel environment.

The stereo microphone 2 includes a left microphone 2L and a right microphone 2R. The left microphone 2L is placed on a left ear 9L of the person 1 being measured, and the right microphone 2R is placed on a right ear 9R of the person 1 being measured. To be specific, the microphones 2L and 2R are preferably placed at a position between the entrance of the ear canal and the eardrum of the left ear 9L and the right ear 9R, respectively. The microphones 2L and 2R pick up a measurement signal output from the stereo speaker 5 and acquires a sound pickup signal. The microphones 2L and 2R output the sound pickup signal to the processing device 201. The person 1 being measured may be a person or a dummy head. In other words, in this embodiment, the person 1 being measured is a concept that includes not only a person but also a dummy head.

Each of the left microphone 2L and the right microphone 2R of the stereo microphone 2 picks up the measurement signal, and outputs the sound pickup signal to the processing device 201. The sound pickup signal acquisition unit 212 acquires the sound pickup signals picked up by the left microphone 2L and the right microphone 2R. The sound pickup signal acquisition unit 212 may include an A/D converter that converts the sound pickup signals from the microphones 2L and 2R from analog to digital. The sound pickup signal acquisition unit 212 may perform synchronous addition of the signals obtained by a plurality of times of measurement.

The left speaker 5L outputs impulse sounds, and thereby the sound pickup signal acquisition unit 212 acquires the sound pickup signal corresponding to the transfer characteristics Hls and the sound pickup signal corresponding to the transfer characteristics Hlo. After that, the right speaker 5R outputs impulse sounds, and thereby the sound pickup signal acquisition unit 212 acquires the sound pickup signal corresponding to the transfer characteristics Hrs and the sound pickup signal corresponding to the transfer characteristics Hro. Note that measurement by the left speaker 5L and measurement by the right speaker 5R may be done in a different order.

As described above, impulse sounds output from the left and right speakers 5L and 5R are picked up by the microphones 2L and 2R, respectively, and impulse response is obtained on the basis of the sound pickup signals. The processing device 201 stores the sound pickup signals acquired on the basis of the impulse response measurement into a memory or the like. The transfer characteristics Hls between the left speaker 5L and the left microphone 2L, the transfer characteristics Hlo between the left speaker 5L and the right microphone 2R, the transfer characteristics Hro between the right speaker 5R and the left microphone 2L, and the transfer characteristics Hrs between the right speaker 5R and the right microphone 2R are thereby measured. Specifically, the left microphone 2L picks up the measurement signal that is output from the left speaker 5L, and thereby the transfer characteristics Hls are acquired. The right microphone 2R picks up the measurement signal that is output from the left speaker 5L, and thereby the transfer characteristics Hlo are acquired. The left microphone 2L picks up the measurement signal that is output from the right speaker 5R, and thereby the transfer characteristics Hro are acquired. The right microphone 2R picks up the measurement signal that is output from the right speaker 5R, and thereby the transfer characteristics Hrs are acquired.

Then, the filter generation unit 213 generates filters appropriate to the transfer characteristics Hls, Hlo, Hro and Hrs from the left and right speakers 5L and 5R to the left and right microphones 2L and 2R on the basis of the sound pickup signals. The filter generation unit 213 cuts out the transfer characteristics Hls, Hlo, Hro and Hrs with a specified filter length and thereby performs predetermined arithmetic processing. In this manner, the processing device 201 generates spatial acoustic filters to be used for convolution calculation of the out-of-head localization device 100.

Next, measurement of the ear canal transfer characteristics and generation of the inverse filters Linv and Rinv are described hereinafter. The person 1 being measured wears the headphones 43 while wearing the microphones 2L and 2R on the left and right ears 9L and 9R, respectively. Specifically, the person 1 being measured wears the headphones 43 over the left and right microphones 2L and 2R. The left microphone 2L and the right microphone 2R are configured to avoid interference with the headphones 43.

Specifically, the person 1 being measured can wear the headphones 43 in the state where the left microphone 2L and the right microphone 2R are placed at appropriate positions in the left ear 9L and the right ear 9R, respectively.

A measurement signal generated by the measurement signal generation unit 211 is output from each of the left unit 43L and the right unit 43R of the headphones 43. The left microphone 2L picks up the sound output from the left unit 43L of the headphones 43. The right microphone 2R picks up the sound output from the right unit 43R of the headphones 43.

As described above, the microphones 2L and 2R pick up the measurement signals output from the headphones 43 and detect the sound pickup signals. The sound pickup signal acquisition unit 212 acquires the sound pickup signals from the microphones 2L and 2R. Note that measurement of the ear canal transfer characteristics and the spatial acoustic transfer characteristics may be performed in a different place by using another processing device 201. Thus, the ear canal transfer characteristics can be measured in a place different from the measurement environment where the stereo speaker 5 is placed.

The processing device 201 stores the sound pickup signals based on the impulse response measurement into a memory or the like. The transfer characteristics between the left unit 43L and the left microphone 2L (i.e., the ear canal transfer characteristics ECTFL of the left ear 9L) and the transfer characteristics between the right unit 43R and the right microphone 2R (i.e., the ear canal transfer characteristics ECTFR of the right ear 9R) are thereby acquired. The processing device 201 includes a memory or the like that stores measurement data.

The processing device 201 calculates the inverse filters Linv and Rinv on the basis of the ear canal transfer characteristics ECTFL and ECTFR. For example, the processing device 201 calculates the frequency-amplitude characteristics and the frequency-phase characteristics of the ear canal transfer characteristics by discrete Fourier transform or discrete cosine transform. Then, the processing device 201 calculates the inverse characteristics of the frequency-amplitude characteristics. Note that the processing device 201 may correct the frequency-amplitude characteristics, its inverse characteristics or the like for each frequency band. The processing device 201 calculates a temporal signal by using the inverse characteristics and the phase characteristics by inverse discrete Fourier transform or the like. The processing device 201 calculates an inverse filter by cutting out the temporal signal with a specified filter length. As described above, the inverse filter is a filter that cancels out the headphone characteristics (characteristics between a reproduction unit of headphones and a microphone). Note that a known technique can be used for calculating the inverse filter, and therefore a method of calculating the inverse filter is not described in detail.

The processing device 201 stores the filters appropriate to the spatial acoustic transfer characteristics Hls, Hlo, Hro and Hrs and the left and right inverse filters Linv and Rinv. In the case where the processing device 201 and the out-of-head localization device 100 are difference devices, the processing device 201 transmits the filters and the inverse filters to the out-of-head localization device 100. Note that connection between the headphones 43 or the stereo speaker 5 and the processing device 201 may be wireless connection using Bluetooth (registered trademark) or the like.

The measurement device 200 performs measurement on the user U who carries out out-of-head localization listening and thereby generates out-of-head localization filters suitable for the user U. Specifically, the measurement device 200 measures the spatial acoustic transfer characteristics and the ear canal transfer characteristics on the user U as the person 1 being measured, and thereby generates the out-of-head localization filters (which are also referred to hereinafter simply as filters) specific to the user U.

(System Configuration)

Figure 3:
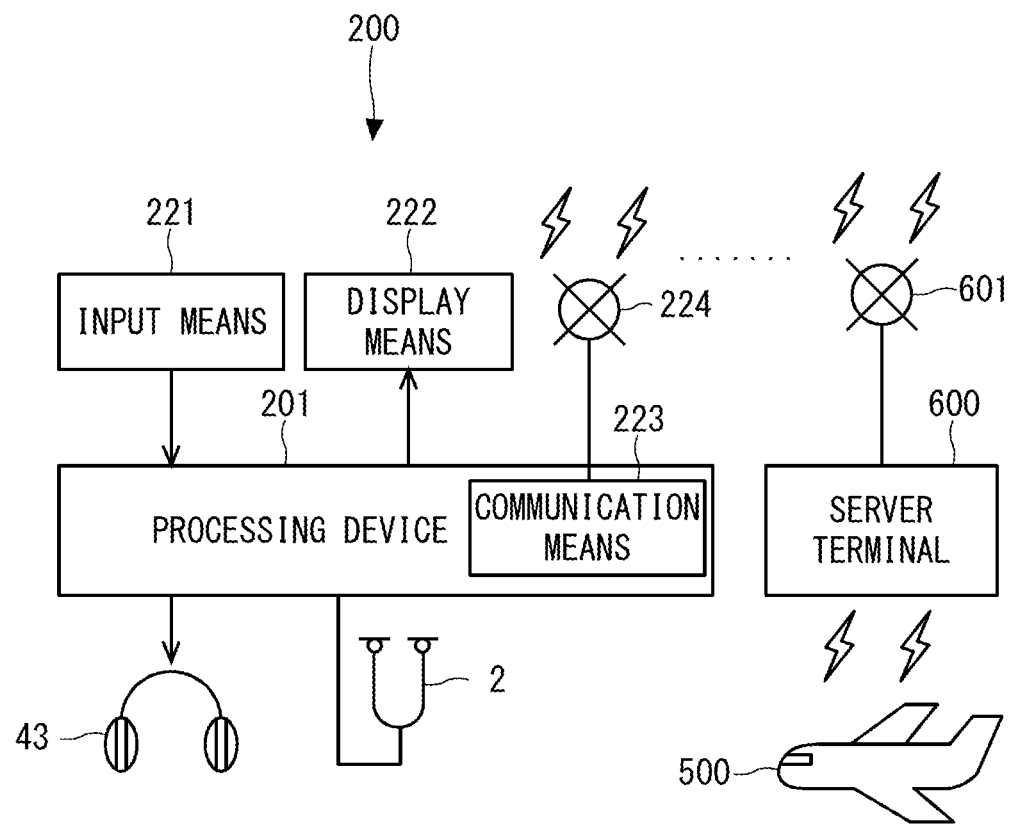
FIG. 3 is a view showing the overall configuration of a system.

A system configuration that performs filter generation and out-of-head localization is described hereinafter with reference to FIG. 3. FIG. 3 is a view schematically showing the overall configuration of the system. A system 1000 includes the measurement device 200 and a server terminal 600. FIG. 3 shows the system 1000 that performs out-of-head localization on a passenger of an aircraft 500. Thus, the user U shown in FIG. 1 is a passenger of the aircraft 500. In this example, a filter and identification information of a passenger are stored in association with each other, thereby allowing the filter to be set for each passenger. This enables out-of-head localization to be performed using a filter that is different from passenger to passenger.

The measurement device 200 is the same as the measurement device 200 shown in FIG. 2. In this example, the measurement device 200 is installed in an airport. For example, the measurement device 200 may be installed in a lounge of an airline company or the like. In the case where a lounge is the measurement environment, the stereo speaker 5, the headphones 43, the processing device 201 and the like are installed in the lounge. Further, a desk or the like to install the measurement device 200 may be placed in the lounge. The processing device 201 may have the out-of-head localization function of the out-of-head localization device 100 shown in FIG. 1.

The measurement device 200 includes an input means 221, a display means 222, a communication means 223, and an antenna 224. The input means 221 includes a keyboard, a mouse, a touch panel and the like, and receives input from a passenger or an operator. Alternatively, in the case of receiving audio input, the input means 221 includes a microphone and a speech recognition function. The display means 222 includes a monitor or the like, and displays an input screen and a measurement screen.

The passenger operates the input means 221 while checking the input screen displayed on the display means 222, and thereby inputs identification information for identifying the passenger. The identification information is unique information assigned to each passenger. For example, a mileage program membership number (member ID) in an airline company of the aircraft 500 which the passenger boards may be used as the identification information. In this case, the input means 221 may be a card scanner that scans a mileage card or the like. The input means 221 may be a device that reads identification information displayed on a screen of a smartphone, identification information stored in an IC chip built into a smartphone, or the like.

As illustrated in FIG. 2, the measurement device 200 performs measurement and generates a filter. The headphones 43 are of the same type as the headphones mounted on the aircraft 500. The headphones 43 are lent by an airline company. Alternatively, a passenger may purchase the headphones 43. Further, a plurality of headphones 43 may be prepared, and the headphones 43 used for measurement may be brought into an airplane by a passenger. In the case where the model of the headphones 43 is different from flight to flight, it is preferred to prepare the headphones 43 of each model in the measurement environment.

The measurement device 200 transmits the generated filter to the server terminal 600. The measurement device 200 transmits the filter to the server terminal 600 in association with the identification information. The server terminal 600 thereby receives the identification information of the passenger and the filter. The server terminal 600 may be located in inside the airplane or outside the airplane.

For example, the communication means 223 includes a modulation circuit that performs modulation or the like on data of the filter and the identification information. The data modulated by the communication means 223 is transmitted from the antenna 224. An antenna 601 of the server terminal 600 receives the data transmitted from the antenna 224.

Figure 4:
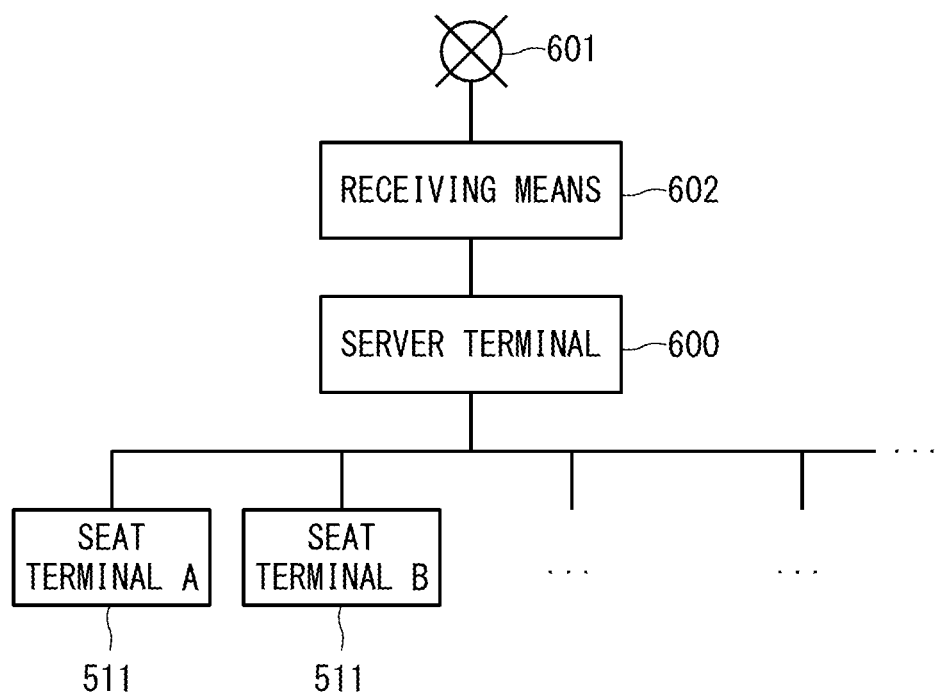
FIG. 4 is a view showing the configuration of a server terminal.

FIG. 4 is a view schematically showing the server terminal 600. A receiving means 602 includes a demodulation circuit that demodulates the received data or the like. The server terminal 600 sets the filter to a seat terminal 511 in the aircraft 500 according to the identification information.

Figure 5:
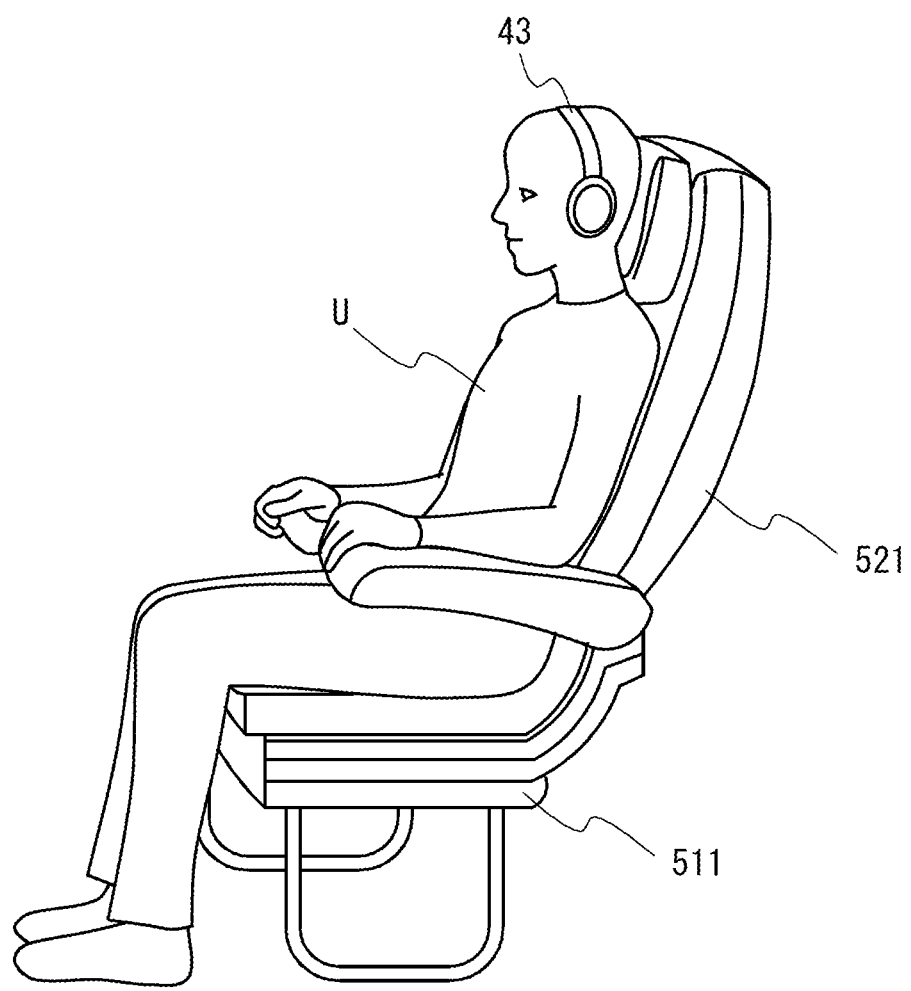
FIG. 5 is a view showing a passenger seat and a seat terminal installed in an aircraft.

The aircraft 500 includes a plurality of passenger seats and a plurality of seat terminals 511. Specifically, in the aircraft 500, the seat terminal 511 is mounted on each passenger seat. FIG. 5 shows an example of a passenger seat and an example of the seat terminal 511. In FIG. 5, the user U (passenger) who is a passenger is sitting in a passenger seat 521. The user U is wearing the headphones 43. The headphones 43 worn by the user U in the airplane are of the same model as the headphones 43 used for measurement.

The seat terminal 511 is installed under the passenger seat 521, mounted on the armrest of the passenger seat 521 or the like, for example. In this case, the seat terminal 511 is installed in each passenger seat 521. The headphones 43 are connected to an earphone jack (not shown) attached to the seat terminal 511. The seat terminal 511 corresponds to the out-of-head localization device 100 shown in FIG. 1.

The seat terminal 511 is installed in each passenger seat 521. Thus, a plurality of passenger seats 521 and a plurality of passenger seats 511 are in one-to-one correspondence. The server terminal 600 stores a seat number of the passenger seat 521 and a terminal number of the seat terminal 511 in association with each other. The terminal number of the seat terminal 511 is, for example, unique information such as an IP address of the seat terminal 511. Further, in the aircraft 500, the passenger seat 521 to sit is assigned to each passenger. Thus, the server terminal 600 stores identification information of a passenger in association with a passenger seat.

For example, an airline company manages identification information of a passenger, a flight number, a seat number, and a terminal number. Therefore, the server terminal 600 is able to identify the airplane which the passenger boards and the passenger seat by referencing the identification information. Then, the server terminal 600 transmits the filter to the seat terminal 511 corresponding to the identified passenger seat 521.

As described above, the measurement device 200 transmits the filter to the server terminal 600 in association with the identification information for identifying the passenger. Then, the server terminal 600 transmits the filter to the seat terminal 511 in the passenger seat 521 of the passenger by referencing the identification information. The system 1000 thereby sets an appropriate filter to each passenger.

Figure 6:
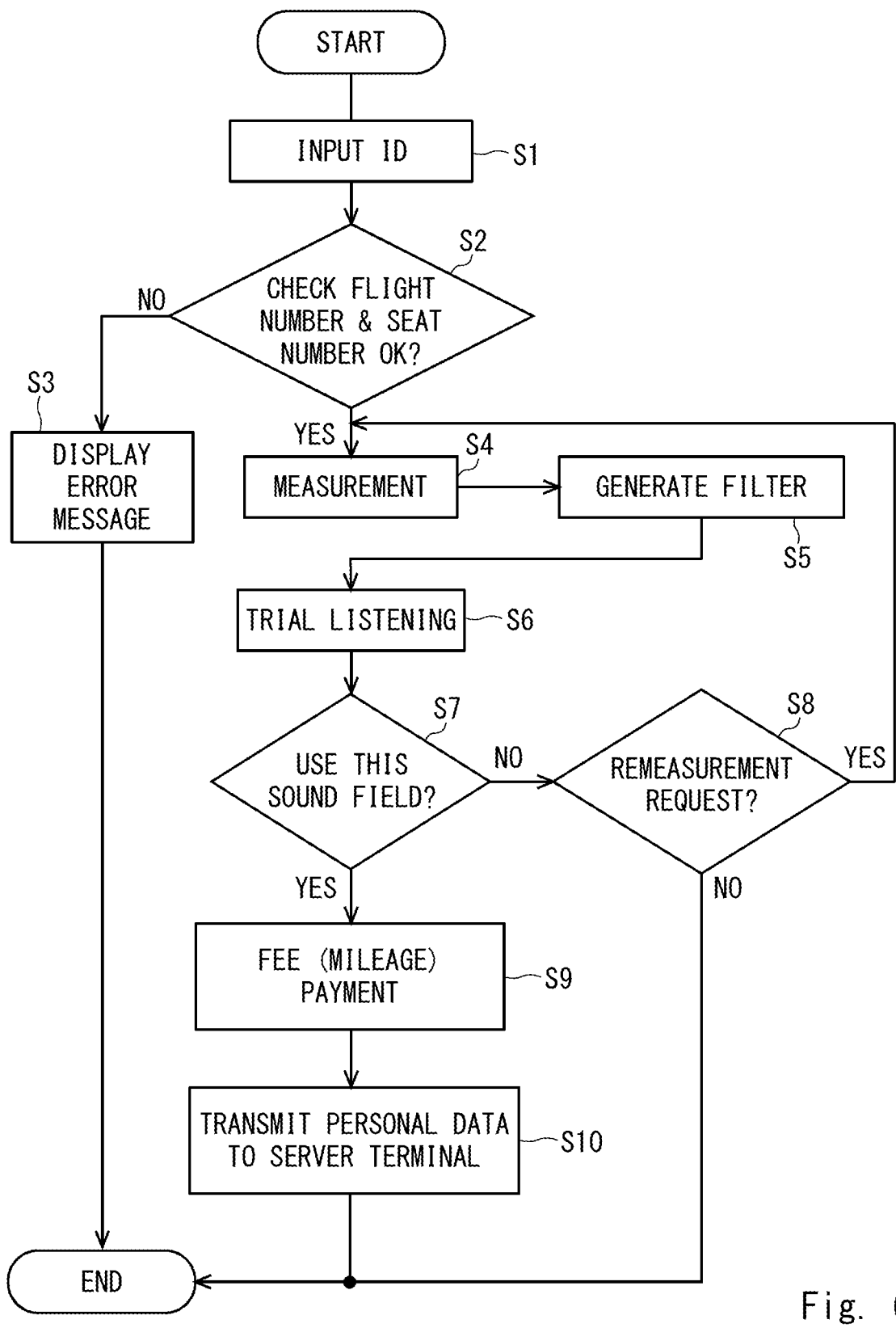
FIG. 6 is a flowchart showing a process in the measurement device.

A process in the measurement device 200 is described hereinafter with reference to FIG. 6. FIG. 6 is a flowchart showing a process in the measurement device 200. First, by operation of a passenger (user U), ID (identification information) of the passenger is input to the processing device 201 (S1). The processing device 201 stores the identification information. Then, the processing device 201 checks the flight number and the seat number of the passenger corresponding to this identification information (S2). For example, the processing device 201 checks the flight number and the seat number by referring to the information of the server terminal 600. When the processing device 201 cannot check the flight number or the seat number (No in S2), an error message is displayed (S3), and the process ends. Specifically, since the processing device 201 cannot identify the flight number and the seat number corresponding to the identification information of the passenger, it displays an error message and finishes the process.

When, on the other hand, the processing device 201 can check the flight number and the seat number (Yes in S2), the measurement device 200 performs measurement of the spatial acoustic transfer characteristics and the ear canal transfer characteristics (S4). The order of measuring the spatial acoustic transfer characteristics and the ear canal transfer characteristics is not particularly limited. Then, the processing device 201 generates filters on the basis of a measurement result (S5). In this example, the processing device 201 stores out-of-head localization filters including four spatial acoustic filters and left and right inverse filters Linv and Rinv.

Next, the out-of-head localization device 100 allows the user U to preview a reproduction signal on which out-of-head localization is performed by using the filters generated in S5 (S6). Specifically, the user U wears the headphones 43 and performs out-of-head localization listening. A sound field where a sound image is localized at an out-of-head position is thereby reproduced. The out-of-head localization device 100 may be a common device to or a different device from the processing device 201 that has performed measurement in S4 and filter generation in S5. When the processing device 201 and the out-of-head localization device 100 are physically separate devices, the processing device 201 transmits the filters to the out-of-head localization device 100 by wired or wireless connection.

Then, the processing device 201 or the out-of-head localization device 100 determines whether or not to use this sound field (filter) (S7). The processing device 201 or the out-of-head localization device 100 determines whether to use this sound field (filter) according to user input. For example, the display means 222 displays, on a monitor, a message, a selection button and the like to confirm whether the previewed sound field is good or not. Alternatively, the processing device 201 may make an inquiry by voice message.

The user U can select whether or not to use the previewed sound field (filter) by operating the input means 221. Specifically, the user U specifies whether the sound field is appropriate or not depending on a listening result of out-of-head localization listening. When the user U has a feeling of strangeness in the sound field on which out-of-head localization is performed, the user U performs input so as not to use this sound field (filter). On the other hand, when the user U likes the sound field on which out-of-head localization is performed, the user U performs input so as to use this sound field (filter). The user U selects (e.g., clicks or taps on) a button to use or not use the sound field (filter) according to the feeling of listening to this sound field. Then, the processing device 201 determines whether to use the sound field (filter) on the basis of the user input.

When the processing device 201 determines not to use this sound field (filter) (No in S7), it determines whether there is a request for remeasurement (S8). The processing device 201 or the out-of-head localization device 100 determines whether there is a request for remeasurement according to user input. For example, the display means 222 displays a remeasurement button, an end button and the like on a monitor. Alternatively, the processing device 201 may make an inquiry about remeasurement by voice message.

When performing remeasurement, the user U selects the remeasurement button. When not performing remeasurement, the user U selects the end button. The processing device 201 receives user input and determines whether to perform remeasurement on the basis of this user input. Input and output using a voice message may be done as a matter of course.

When, in S8, it is determined that there is no request for remeasurement (No in S8), the processing device 201 finishes the process. When, in S8, it is determined that there is a request for remeasurement (Yes in S8), the process returns to S4 to perform remeasurement. Then, the measurement device 200 generates the filters on the basis of a remeasurement result (S5). After that, the out-of-head localization device 100 carries out preview again by using the filters obtained by remeasurement (S6).

When, in S7, the processing device 201 determines to use this sound field (filter) (Yes in S7), it receives a fee payment from the user U (S9). Fees may be paid by credit card, cash, or even points such as airline mileage. The processing device 201 then transmits personal data containing the filters and the identification information to the server terminal 600 (S10). The process thereby ends.

Figure 7:
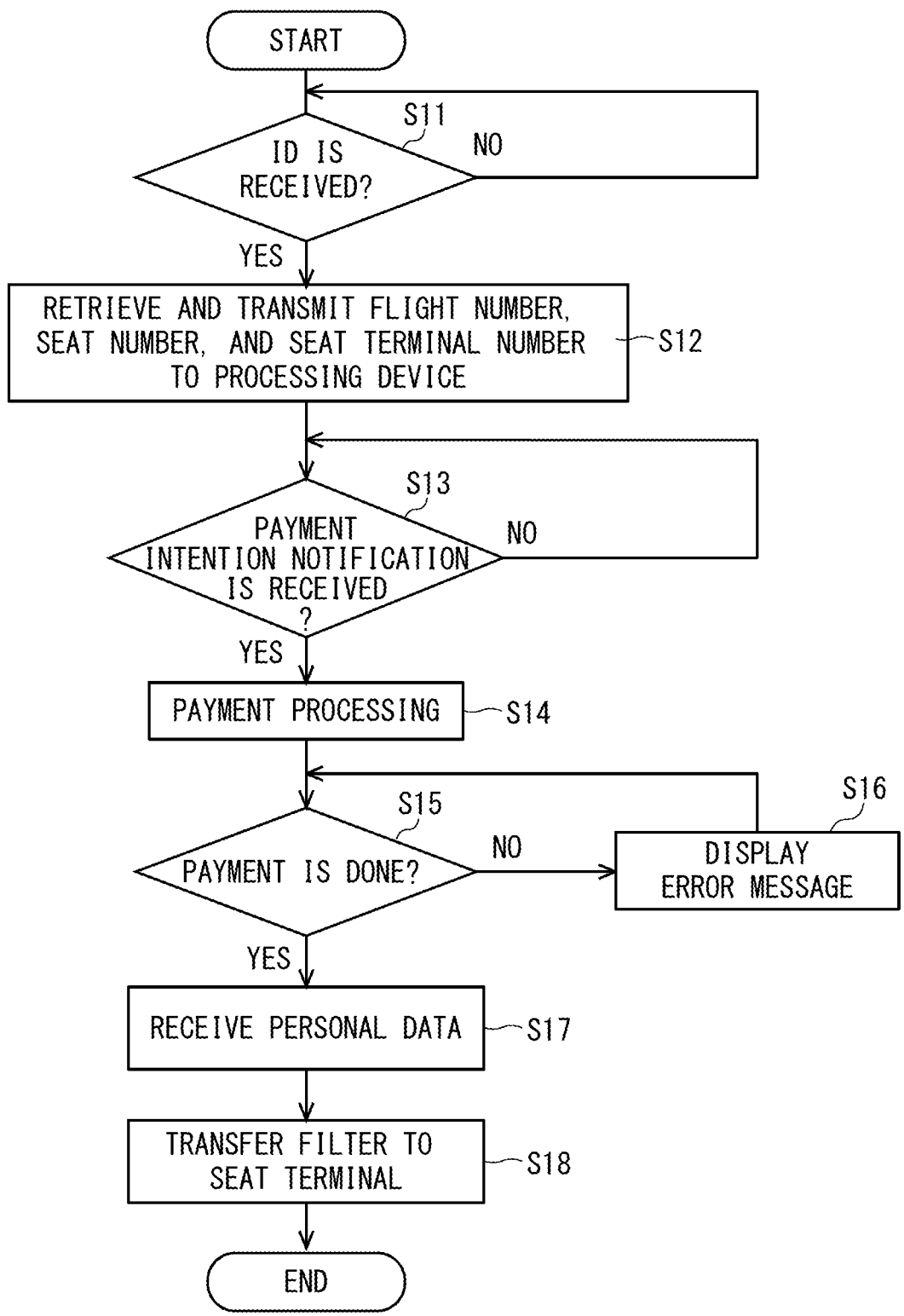
FIG. 7 is a flowchart showing a process in the server terminal.

A process in the server terminal 600 is described hereinafter with reference to FIG. 7. FIG. 7 is a flowchart showing a process in the server terminal 600. First, the server terminal 600 determines whether ID (identification information) of a passenger is received or not (S11). In this example, the server terminal 600 determines whether it has received the identification information input in S1 of FIG. 6 from the processing device 201. When the server terminal 600 has not received the identification information (No in S11), this processing is repeated until the server terminal 600 receives the identification information.

When the server terminal 600 has received the identification information (Yes in S11), it retrieves the flight number, the seat number, and the seat terminal number corresponding to this identification information and transmits them to the processing device 201 (S12). The server terminal 600 identifies the flight number, the seat number, and the seat terminal number for the passenger with this identification information by referring to flight information or the like managed by an airline company. Note that the processing device 201 makes determination in S2 of FIG. 6 on the basis of the flight number and the seat number transmitted in S12.

Then, the server terminal 600 determines whether a payment intention notification is received or not (S13). In this example, the server terminal 600 determines whether a fee payment is done in S9 of FIG. 6. When the server terminal 600 has not received the payment intention notification (No in S13), it waits until receiving the payment intention notification.

When the server terminal 600 has received the payment intention notification (Yes in S13), it executes payment processing (S14). Then, the server terminal 600 determines whether a payment is completed or not (S15). When a payment is not completed (No in S15), the server terminal 600 displays an error message on the display means 222 (S16). Specifically, the server terminal 600 transmits an error message to the processing device 201 when there are not enough points remaining or the like. The display means 222 of the processing device 201 thereby displays an error message for the user U.

When a payment is completed (Yes in S15), the server terminal 600 receives the personal data (S17). Specifically, the server terminal 600 receives the personal data transmitted from the processing device 201 in S10 of FIG. 6. The personal data contains the identification information and the filters. Then, the server terminal 600 transfers the filters to the seat terminal 511 by referring to the identification information. Specifically, it transmits the filters to the seat terminal 511 in the passenger seat corresponding to the identification information (S18). The filters appropriate to the passenger are thereby set to the seat terminal 511.

When the passenger turns on the out-of-head localization function after getting aboard an aircraft, the seat terminal 511 performs out-of-head localization by using filters. Specifically, the seat terminal 511 functions as the out-of-head localization device 100 in FIG. 1. The headphones 43 thereby output the reproduction signal on which out-of-head localization is performed to the passenger. In this manner, the passenger can perform out-of-head localization listening by using the filters appropriate to the spatial acoustic transfer characteristics and the ear canal transfer characteristics measured for the passenger. This enables out-of-head localization listening to be performed by using appropriate filters.

The passenger can thereby listen to the reproduction signal in a relaxed manner while sitting in the passenger seat 521 and therefore spend time comfortably even during lengthy travel. Since the identification information and the filters are associated with each other, the passenger can enjoy out-of-head localization listening in the same way even in an airplane after flight connection. Further, after flight arrival, the generated filters may be stored in association with the identification information into the server terminal 600. This allows skipping a part or the whole of measurement for the passenger in the next or subsequent flight. This also promotes the use of the remaining mileage.

Further, this enables out-of-head localization to be done in an entertainment system mounted on an aircraft. Thus, the passenger is able to perform out-of-head localization listening of not only the reproduction signal of music but also the reproduction signal of a movie, a game and the like.

As described above, the system 1000 according to the first embodiment includes the measurement device 200, the measurement device 200, and the server terminal 600. The measurement device 200 measures transfer characteristics by using a microphone worn on a user's ear before the user U boards a vehicle. The seat terminal 511 is an out-of-head localization device that is mounted on a vehicle and performs out-of-head localization by using filters appropriate to the transfer characteristics. The server terminal transmits the filters appropriate to the transfer characteristics to the seat terminal 511 on the basis of identification information of the user. This achieves appropriate out-of-head localization on a passenger (the user U).

Although an example in which a passenger of an aircraft performs out-of-head localization listening is described above, a vehicle which a passenger boards is not limited to an aircraft. The headphones 43 may output the reproduction signal on which out-of-head localization is performed to a passenger of a train, a bus, a ship or the like, which is mentioned earlier. In the case of a train, a bus, a ship or the like, the measurement device 200 may be installed in a station, a bus terminal, a waiting room in a port or the like. Further, the vehicle may be an attraction in an amusement park. In this case, the out-of-head localization device 100 may be mounted on a vehicle that stays in place, not limited to a vehicle that actually moves.

A terminal that serves as the out-of-head localization device is associated with the identification information of a passenger. Then, each passenger wears headphones or earphones in a passenger seat. A reproduction device is installed in each passenger seat, and the reproduction device performs out-of-head localization by using filters suitable for the passenger. As a matter of course, the reproduction device may refrain from performing out-of-head localization for some passengers. Further, a common reproduction signal may be used for a plurality of passengers. In this case, a device that reproduces a reproduction signal is common, and processing using the out-of-head localization filters is performed for each of the passengers. Furthermore, headphones or earphones are not limited to those installed in the measurement environment and may be those brought by the user U.

Second Embodiment (Generation of Spatial Acoustic Filter)

Although the first embodiment is described on the basis of the assumption that the measurement device 200 measures both of the spatial acoustic transfer characteristics and the ear canal transfer characteristics, there is a case where some transfer characteristics cannot be measured. Due to restrictions in the measurement environment or the like, all of the spatial acoustic transfer characteristics Hls, Hlo, Hro and Hrs and the left and right ear canal transfer characteristics ECTFL and ECTFR cannot be measured in some cases for the user U who performs out-of-head localization listening. Particularly, measurement of the spatial acoustic transfer characteristics needs to install one or a plurality of speakers in positions apart from the user U. Thus, there is a case where a large and quiet measurement environment cannot be prepared in an airport or the like.

On the other hand, the ear canal transfer characteristics are measured with headphones worn. Thus, a large and quiet measurement environment that is required in measurement of the spatial acoustic transfer characteristics is not required in measurement of the ear canal transfer characteristics. Therefore, it is desirable to acquire all of the out-of-head localization filters by performing measurement of only the ear canal transfer characteristics on a passenger. Specifically, it is desirable to generate a spatial acoustic filter suitable for a passenger without performing measurement of the spatial acoustic transfer characteristics using a speaker. A method of generating a spatial acoustic filter suitable for a passenger from a measurement result of the ear canal transfer characteristics is described hereinafter.

Figure 8:
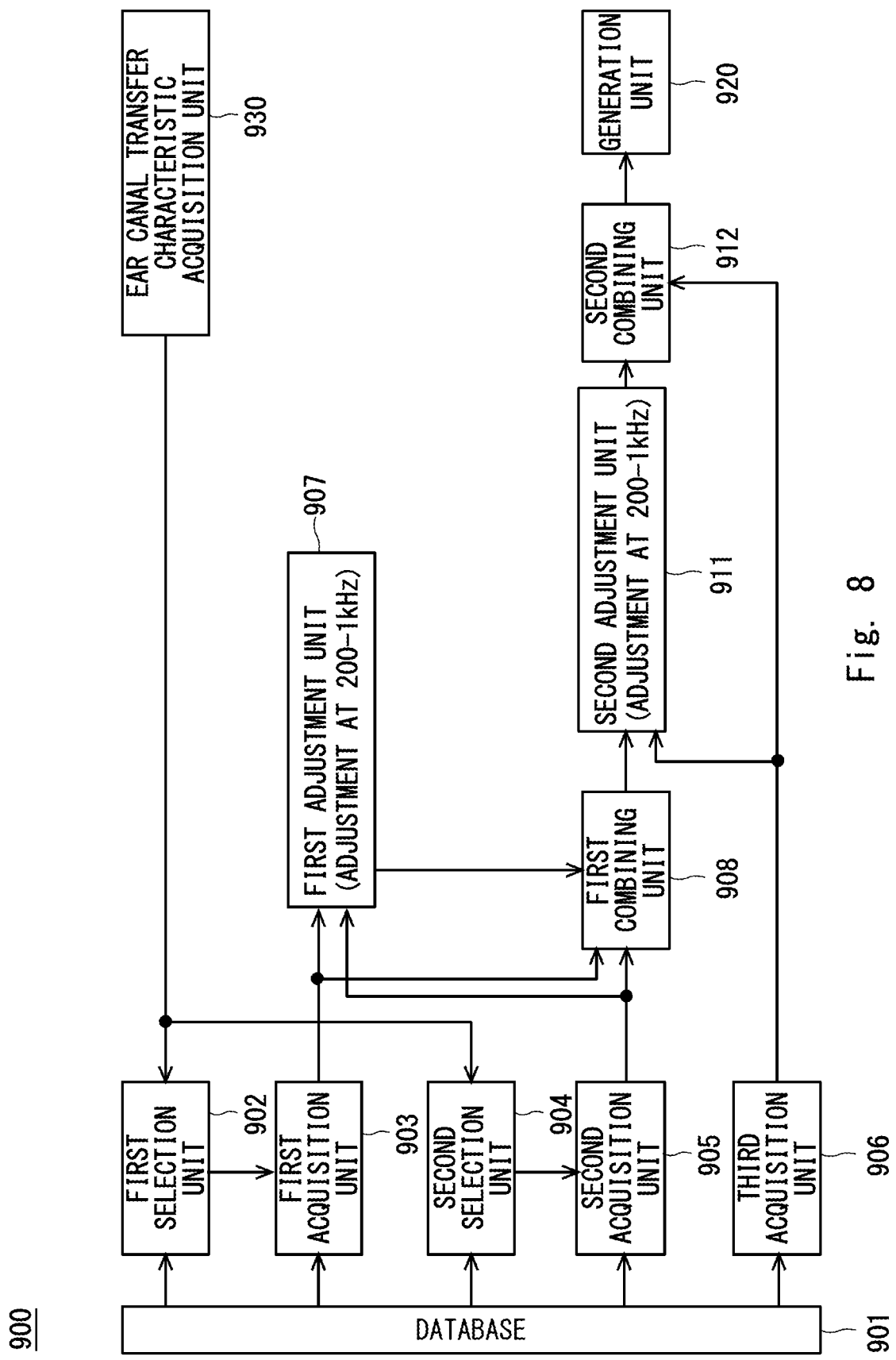
FIG. 8 is a block diagram showing the configuration of a filter generation device according to a second embodiment.

A filter generation device that generates spatial acoustic filters on the basis of measurement results of the ear canal transfer characteristics ECTFL and ECTFR is described hereinafter with reference to FIG. 8. FIG. 8 is a block diagram showing the configuration of a filter generation device 900. Note that the filter generation device 900 may be the same device as or a different device from the processing device 201. Further, the filter generation device 900 is not limited to a physically single device. For example, when the filter generation device 900 and the processing device 201 are different devices, a part of the processing described later may be performed in the processing device 201. Further, a database 901 may be stored in a different device or may be stored in a distributed manner in a plurality of devices.

The filter generation device 900 includes the database 901, a first selection unit 902, a first acquisition unit 903, a second selection unit 904, a second acquisition unit 905, a third acquisition unit 906, a first adjustment unit 907, a first combining unit 908, a second adjustment unit 911, a second combining unit 912, a generation unit 920, and an ear canal transfer characteristic acquisition unit 930.

The ear canal transfer characteristic acquisition unit 930 acquires a measurement result of the ear canal transfer characteristics of the user U. Note that, in the case where the filter generation device 900 is a different device from the processing device 201, the ear canal transfer characteristics of the user U is transmitted to the ear canal transfer characteristic acquisition unit 930 by wired or wireless communication.

The database 901 stores characteristic data of a plurality of persons. Specifically, measurement of the spatial acoustic transfer characteristics and the ear canal transfer characteristics is done for a plurality of persons 1 being measured. Then, the database 901 stores, as the characteristic data, data of the spatial acoustic transfer characteristics and the ear canal transfer characteristics based on measurement results on a plurality of persons. To be specific, the database 901 stores a plurality of sets of first characteristic data and second characteristic data. For example, measurement of the ear canal transfer characteristics is performed beforehand on N (N is an integer of 2 or more) number of persons 1 being measured. Thus, the database 901 stores N number of sets of characteristic data for the left ear, and stores N number of sets of characteristic data for the right ear.

The first characteristic data is data corresponding to the spatial acoustic transfer characteristics from a speaker, which is a sound source, to a microphone. The first characteristic data is a frequency response of the spatial acoustic transfer characteristics, for example. To be specific, the first characteristic data includes amplitude characteristics in the frequency domain. The first characteristic data may include power characteristics instead of the amplitude characteristics. Further, the first characteristic data preferably has the frequency-amplitude characteristics of a direct sound part of the spatial acoustic transfer characteristics. The first characteristic data may have a signal in the time domain. For example, the signal in the time domain is a sound pickup signal picked up by the microphones 2L and 2R of the measurement device 200. Alternatively, the signal in the time domain may be a signal obtained by cutting out the sound pickup signal picked up by the microphones 2L and 2R with a specified filter length.

The second characteristic data is data corresponding to the ear canal transfer characteristics. The second characteristic data is a frequency response of the ear canal transfer characteristics, for example. To be specific, the second characteristic data includes amplitude characteristics in the frequency domain. The second characteristic data may include power characteristics instead of the amplitude characteristics. Further, the second characteristic data may have the phase characteristics in the frequency domain. The second characteristic data may have a signal in the time domain. For example, the signal in the time domain is a sound pickup signal picked up by the microphones 2L and 2R of the measurement device 200. Alternatively, the signal in the time domain may be a signal obtained by cutting out the sound pickup signal picked up by the microphones 2L and 2R with a specified filter length.

The processing device 201, the filter generation device 900 or the like performs discrete Fourier transform, discrete cosine transform or the like on the sound pickup signal in the time domain, and thereby the frequency-amplitude characteristics or the like are obtained. Further, the frequency-amplitude characteristics may be obtained by performing discrete Fourier transform, discrete cosine transform or the like on a filter obtained by cutting out the sound pickup signal picked up with a specified filter length. Alternatively, the database 901 may store the sound pickup signal in the time domain and the filter as the first characteristic data and the second characteristic data, and the frequency-amplitude characteristics may be obtained by performing fast Fourier transform (FFT) or the like each time performing the filter generation process.

The first and second characteristic data stored in the database 901 are described hereinafter with reference to FIG. 9. For the person 1 being measured as the first person (first set), data related to the spatial acoustic transfer characteristics Hls, Hlo, Hro and Hrs are referred to as the first characteristic data Hls_DB1, Hlo_DB1, Hro_DB1 and Hrs_DB1, respectively. For the N-th person and the like, they are referred to as the first characteristic data Hls_DBN, Hlo_DBN, Hro_DBN and Hrs_DBN, and the like. The first characteristic data Hls_DB1 to Hls_DBN for N number of persons stored in the database 901 are collectively referred to as the first characteristic data Hls_DB. Likewise, the first characteristic data Hlo_DB1 to Hlo_DBN, Hro_DB1 to Hro_DBN, and Hrs_DB1 to Hrs_DBN for N number of persons are collectively referred to as the first characteristic data Hlo_DB, Hro_DB, and Hrs_DB, respectively, For the first person 1 being measured, data related to the ear canal transfer characteristics ECTFL and ECTFR are referred to as the second characteristic data ECTFL_DB1 and ECTFR_DB1, respectively. For the N-th person 1 being measured and the like, data related to the ear canal transfer characteristics ECTFL and ECTFR are referred to as the second characteristic data ECTFL_DBN, ECTFR_DBN and the like. Further, the second characteristic data ECTFL_DB1 to ECTFL_DBN for N number of persons stored in the database 901 are collectively referred to as the second characteristic data ECTFL_DB. Likewise, the second characteristic data ECTFR_DB1 to ECTFR_DBN for N number of persons are collectively referred to as the second characteristic data ECTFR_DB.

The database 901 stores, as one set, the first characteristic data Hls_DB1 and Hro_DB1 and the second characteristic data ECTFL_DB1 related to the left ear of the first person 1 being measured. Likewise, the database 901 stores, as one set, the first characteristic data Hls_DBN and Hro_DBN and the second characteristic data ECTFL_DBN related to the left ear of the N-th person 1 being measured. Further, the database 901 stores, as one set, the first characteristic data Hlo_DB1 and Hrs_DB1 and the second characteristic data ECTFR_DB1 related to the right ear of the first person 1 being measured. The database 901 stores, as one set, the first characteristic data Hlo_DBN and Hrs_DBN and the second characteristic data CTFR_DBN related to the right ear of the N-th person 1 being measured.

Thus, one set at least includes three frequency-amplitude characteristics. The database 901 stores the characteristic data of different ears of the same person 1 being measured as different sets. As a matter of course, the number of first characteristic data contained in one set varies depending on the number of channels of a speaker. Further, the database 901 may store the first and second characteristic data in association with identification information.

Further, each of the first characteristic data Hls_DB, Hlo_DB, Hro_DB and Hrs_DB preferably has two types of frequency-amplitude characteristics. For example, the first characteristic data Hls_DB1 preferably has the frequency-amplitude characteristics of a direct sound part and the frequency-amplitude characteristics of a direct sound part and a reflected sound part. The frequency-amplitude characteristics of a direct sound part and a reflected sound part are obtained by performing FFT of the sound pickup signal in the time domain that contains a direct sound and a reflected sound. The frequency-amplitude characteristics of a direct sound part is obtained by performing FFT of the sound pickup signal in the time domain that contains only a direct sound without containing a reflected sound. Note that the direct sound is a sound that directly reaches the ear (microphone) from a sound source (speaker), and the reflected sound is a sound from a sound source that is reflected on a wall surface or the like and thereby reaches the ear. The reflected sound reaches the microphone after the direct sound reaches it. The same applies to other first characteristic data Hlo_DB1, Hro_DB1, Hrs_DB1 and the like.

Figure 10:
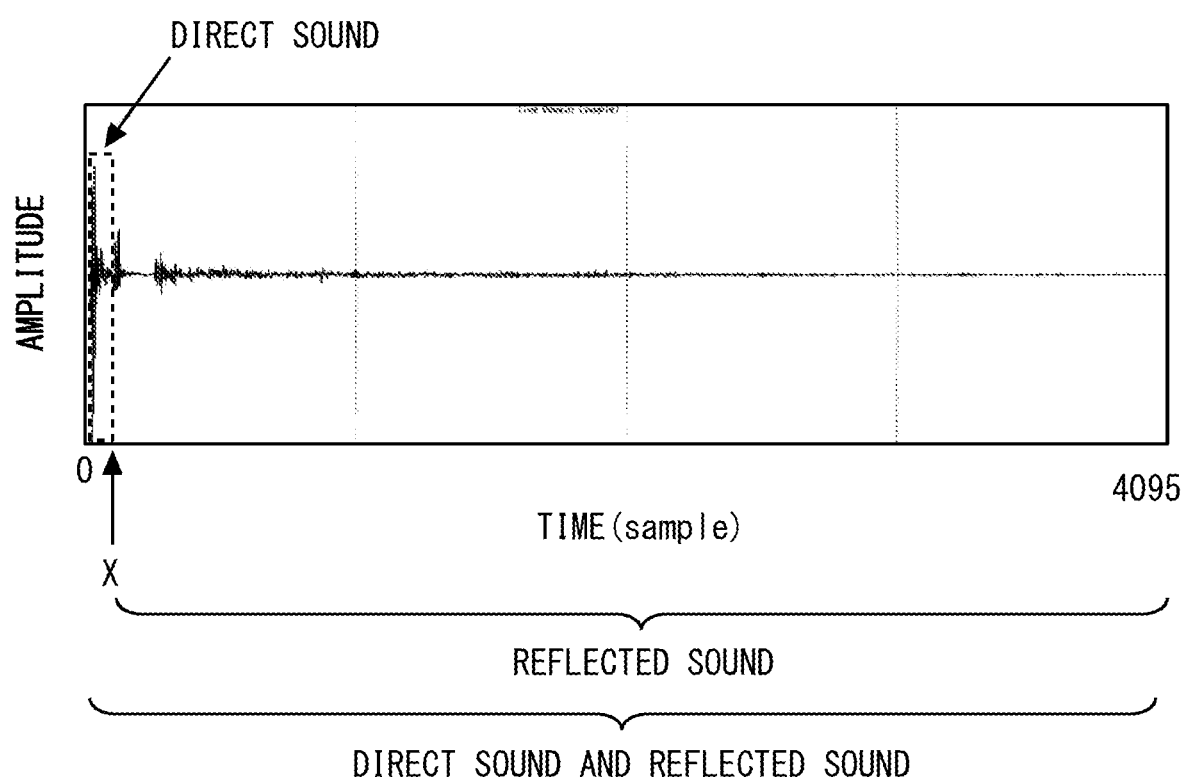
FIG. 10 is a view illustrating a direct sound and a reflected sound in a sound pickup signal.

For example, the case where a sound pickup signal of 0 to 4095 samples is picked up in measurement of the spatial acoustic transfer characteristics as shown in FIG. 10, for example, is described. In this case, the frequency-amplitude characteristics of a direct sound and a reflected sound are obtained by Fourier transform of the whole of the sound pickup signal of 0 to 4095 samples. The frequency-amplitude characteristics of a direct sound are obtained by cutting out a direct sound signal (the dotted part in FIG. 10) of 0 to X (X is an integer of 1 or more) samples from the sound pickup signal of 0 to 4095 samples and performing Fourier transform of the cut-out direct sound signal.

In this manner, in the database 901, the first characteristic data Hls_DB1 preferably contains the frequency-amplitude characteristics of a direct sound and the frequency-amplitude characteristics of a direct sound and a reflected sound. Likewise, each of the first characteristic data Hlo_DB1, Hro_DB1 and Hrs_DB1 preferably contains the frequency-amplitude characteristics of a direct sound part and the frequency-amplitude characteristics of a direct sound part and a reflected sound part. The same applies to the second to N-th persons.

The measurement device 200 shown in FIG. 2 measures the ear canal transfer characteristics ECTFL and ECTFR on the user U who performs out-of-head localization listening. A measurement result on the user U is input to the ear canal transfer characteristic acquisition unit 930. The ear canal transfer characteristics ECTFL and ECTFR measured on the user U who is a passenger are hereinafter referred to as the ear canal transfer characteristics ECTFL_U and ECTFR_U, respectively.

The filter generation device 900 performs filter generation for the ear canal transfer characteristics ECTFL_U. The filter generation device 900 thereby generates filters (which are hereinafter referred to as filters F_Hls_U and F_Hro_U) related to the spatial acoustic transfer characteristics Hls and Hro, respectively, for the left ear of the user U. Thus, the filter generation device 900 generates the two filters F_Hls_U and F_Hro_U on the basis of the ear canal transfer characteristics ECTFL_U. At this time, the filter generation device 900 may refer to the set related only to the left ear of a plurality of persons 1 being measured or may refer to the set related to both ears of them.

Likewise, the filter generation device 900 performs filter generation for the ear canal transfer characteristics ECTFR_U. The filter generation device 900 thereby generates filters (which are hereinafter referred to as filters F_Hlo_U and F_Hrs_U) related to the spatial acoustic transfer characteristics Hlo and Hrs, respectively, for the right ear of the user U. Thus, the filter generation device 900 generates the two filters F_Hlo_U and F_Hrs_U on the basis of the ear canal transfer characteristics ECTFR_U. At this time, the filter generation device 900 may refer to the set related only to the right ear of a plurality of persons 1 being measured or may refer to the set related to both ears of them.

Note that processing of the filters F_Hls_U and F_Hro_U and processing of the filters F_Hlo_U and F_Hrs_U are the same. Therefore, the processing of generating the filters F_Hls_U and F_Hro_U on the basis of the ear canal transfer characteristics ECTFL_U is described hereinafter.

The first selection unit 902 refers to the database 901 and selects the first set on the basis of the ear canal transfer characteristics ECTFL_U. For example, the first selection unit 902 compares the frequency-amplitude characteristics of the ear canal transfer characteristics ECTFL_U with the second characteristic data ECTFL_DB in a first frequency band (e.g., 1 kHz to 4 kHz). To be specific, the first selection unit 902 calculates a correlation value between each of the second characteristic data ECTFL_DB1 to ECTFL_DBN and the ear canal transfer characteristics ECTFL_U. The first selection unit 902 calculates correlation values of the frequency-amplitude characteristics in the first frequency band. Then, the first selection unit 902 selects the set containing the second characteristic data ECTFL_DBk (k is any integer of 1 to N) with the greatest correlation value. The set selected by the first selection unit 902 is referred to as a first set.

The first acquisition unit 903 acquires, from the database 901, the first characteristic data Hls_DBk and Hro_DBk contained in the first set. The first acquisition unit 903 outputs the frequency-amplitude characteristics of a direct sound part to the first combining unit 908, and outputs the frequency-amplitude characteristics of a direct sound part and a reflected sound part to the first adjustment unit 907.

The second selection unit 904 refers to the database 901 and selects the second set on the basis of the ear canal transfer characteristics ECTFL_U. For example, the second selection unit 904 compares the frequency-amplitude characteristics of the ear canal transfer characteristics ECTFL_U with the second characteristic data ECTFL_DB in a second frequency band (e.g., 4 kHz to 15 kHz). The second selection unit 904 calculates a correlation value between each of the second characteristic data ECTFL_DB1 to ECTFL_DBN and the ear canal transfer characteristics ECTFL_U. The second selection unit 904 calculates correlation values of the frequency-amplitude characteristics in the second frequency band. Then, the second selection unit 904 selects the set containing the second characteristic data ECTFL_DBm (m is an integer of 1 to N) with the greatest correlation value. The set selected by the second selection unit 904 is referred to as a second set.

The second acquisition unit 905 acquires, from the database 901, the first characteristic data Hls_DBm and Hro_DBm contained in the second set. The second acquisition unit 905 outputs the frequency-amplitude characteristics of a direct sound part to the first combining unit 908, and outputs the frequency-amplitude characteristics of a direct sound part and a reflected sound part to the first adjustment unit 907.

The first adjustment unit 907 calculates a gain value for adjusting the amplitude level between the first characteristic data Hls_DBk and Hro_DBk and the first characteristic data Hls_DBm and Hro_DBm. For example, the first adjustment unit 907 calculates a gain value that equalizes the amplitude level between the first characteristic data Hls_DBk and the first characteristic data Hls_DBm in a frequency band for adjustment (200 Hz to 1 kHz). Then, one or both of the first characteristic data are multiplied by this gain value, thereby increasing or decreasing the amplitude level of the first characteristic data. To be specific, the amplitude level is adjusted by multiplying the amplitude characteristics by the gain value (factor) so as to equalize the sum of the discrete amplitudes in the frequency band for adjustment.

To be more specific, in the frequency band for adjustment, when the amplitude level of the first characteristic data Hls_DBk is higher than the amplitude level of the first characteristic data Hls_DBm, the first adjustment unit 907 calculates a gain value for decreasing the amplitude level of the first characteristic data Hls_DBk. Alternatively, when the amplitude level of the first characteristic data Hls_DBk is higher than the amplitude level of the first characteristic data Hls_DBm, the first adjustment unit 907 calculates a gain value for increasing the amplitude level of the first characteristic data Hls_DBm. As a matter of course, the first adjustment unit 907 may calculate two gain values so that both amplitude levels are included in a specified range. In this case, each of the first characteristic data Hls_DBm and the first characteristic data Hls_DBk is multiplied by a gain value. Note that the first adjustment unit 907 may set a common gain value or calculate different gain values for the first characteristic data Hls_DBk and Hro_DBk.

As described above, the first characteristic data is based on results of measurement performed on a plurality of persons 1 being measured. In each measurement, the volume level of a speaker and the sensitivity of a microphone are not necessarily the same. Further, there are cases where the measurement environment is different or different speakers or microphones are used. Thus, the first adjustment unit 907 adjusts the amplitude level of the first characteristic data in different sets. For example, the first adjustment unit 907 calculates a gain value for adjusting the balance of two frequency-amplitude characteristics. This enables the adjustment of the balance of the amplitude levels of the first characteristic data in different sets. In this example, the gain value is calculated in the frequency-amplitude characteristics of a direct sound and a reflected sound.

Then, the first adjustment unit 907 outputs the gain value for adjusting the amplitude level to the first combining unit 908. The first combining unit 908 multiplies the first characteristic data by the gain value to make level adjustment, and then combines the first characteristic data Hls_DBk and the first characteristic data Hls_DBm. The first combining unit 908 multiplies the first characteristic data by the gain value to make level adjustment, and then combines the first characteristic data Hro_DBk and the first characteristic data Hro_DBm.

In this example, the first combining unit 908 combines direct sounds. Specifically, the first characteristic data Hls_DBk and Hro_DBk and the first characteristic data Hls_DBm and Hro_DBm to be combined are the frequency-amplitude characteristics of a direct sound. The first combining unit 908 substitutes the amplitude value of the first characteristic data Hls_DBk for the amplitude value of the first characteristic data Hls_DBm in the first frequency band (1 kHz to 4 kHz). The first combining unit 908 substitutes the amplitude value of the first characteristic data Hro_DBk for the amplitude value of the first characteristic data Hro_DBm in the first frequency band. The first combining unit 908 outputs the frequency-amplitude characteristics after the substitution as first combined data Hls_com1 and Hro_com1 to the second adjustment unit 911.

In the first combined data Hls_com1 and Hro_com1, the amplitude value in the first frequency band is based on the first characteristic data Hls_DBk and Hro_DBk, and the amplitude value outside the first frequency band is based on the second characteristic data Hls_DBm and Hro_DBm.

Alternatively, in the first combined data Hls_com1 and Hro_com1, the amplitude value in the second frequency band may be based on the first characteristic data Hls_DBm and Hro_DBm, and the amplitude value outside the second frequency band may be based on the first characteristic data Hls_DBk and Hro_DBk. The first combining unit 908 may combine the frequency-amplitude characteristics so as to balance between the first characteristic data Hls_DBm and Hro_DBmn and the first characteristic data Hls_DBk and Hro_DBk, i.e., so that the level of the frequency band for adjustment is included in a specified range.

The third acquisition unit 906 refers to the database 901 and acquires first characteristic data Hls_DBps and Hro_DBps (which are hereinafter referred to as preset data Hls_DBps and Hro_DBps) that are set in advance. The preset data Hls_DBps and Hro_DBps are data of one representative person (one set) of the first characteristic data Hls_DB and Hro_DB.

The preset data Hls_DBps and Hro_DBps are preferably the first characteristic data of the person 1 being measured having a favorable balance of the left and right phase characteristics and amplitude level. Thus, the preset data Hls_DBps, Hlo_DBps, Hro_DBps, and Hrs_DBps are the first characteristic data of the same person 1 being measured. Further, it is preferred that the first characteristic data with no significant dip in the frequency-amplitude characteristics at 1 kHz or lower is set as the preset data. Furthermore, it is preferred that the first characteristic data of the person 1 being measured whose frequency-amplitude characteristics at 100 kHz or lower are uniform in the four spatial acoustic transfer characteristics Hls, Hlo, Hro and Hrs at 100 kHz are the preset data. The preset data is previously set by an administrator or the like of the system.

Further, a plurality of sets of candidates for the preset data may be prepared, and one set of preset data may be selected on the basis of the ear canal transfer characteristics ECTFL_U. In this case, one set of preset data having the second characteristic data with the highest correlation value with the ear canal transfer characteristics ECTFL_U may be selected among the plurality of sets of candidates for the preset data.

The third acquisition unit 906 acquires the preset data Hls_DBps and Hro_DBps and outputs them to the second combining unit 912 and the second adjustment unit 911. Although the preset data Hls_DBps and Hro_DBps are the frequency-amplitude characteristics of a direct sound part, they may be the frequency-amplitude characteristics of a direct sound part and a reflected sound part.

A gain value for adjusting the amplitude level of the first combined data Hls_com1 and Hro_com1 and the preset data Hls_DBps and Hro_DBps is calculated. The second adjustment unit 911, just like the first adjustment unit 907, calculates a gain value that equalizes the amplitude level between the first combined data Hls_com1 and the preset data Hls_DBps in the frequency band for adjustment (200 Hz to 1 kHz). Then, at least one of the first combined data and the first preset data is multiplied by the gain value, thereby adjusting the amplitude level. The second adjustment unit 911 performs the same processing as the first adjustment unit 907, and therefore the description thereof is omitted.

The second adjustment unit 911 outputs the gain value to the second combining unit 912. The second combining unit 912 makes level adjustment using the gain value, and then combines the first combined data Hls_com1 and the preset data Hls_DBps. The second combining unit 912 makes level adjustment using the gain value, and then combines the first combined data Hro_com1 and the preset data Hro_DBps. Second combined data Hro_com2 and Hro_com2 are thereby generated.

The second combining unit 912 combines direct sounds. Specifically, the first combined data Hls_com1 and Hro_com1 and the preset data Hls_DBps and Hro_DBps are the frequency-amplitude characteristics of a direct sound. The second combining unit 912 substitutes the amplitude value of the preset data Hls_DBps for the amplitude value of the first combined data Hls_com1 in a third frequency band (minimum frequency to 1 kHz). The second combining unit 912 substitutes the amplitude value of the preset data Hro_DBps for the amplitude value of the first combined data Hro_com1 in the third frequency band (minimum frequency to 1 kHz). Note that the minimum frequency is the lowest frequency in the frequency response obtained by FFT, and it is 1 Hz, for example.

In the second combined data Hls_com2 and Hro_com2, the amplitude value in the third frequency band (minimum frequency to 1 kHz) is based on the preset data Hls_DBps and Hro_DBps. In the second combined data Hls_com2 and Hro_com2, the amplitude value in the first frequency band (1 kHz to 4 kHz) is based on the first characteristic data Hls_DBk and Hro_DBk. In the second combined data Hls_com2 and Hro_com2, the amplitude value in the second frequency band (4 kHz to 15 kHz) is based on the second characteristic data Hls_DBm and Hro_DBm. Note that the amplitude value in a fourth frequency band (15 kHz to maximum frequency) other than the first frequency band, the second frequency band and the third frequency band may be based on the second characteristic data Hls_DBm and Hro_DBm or may be based on the preset data Hls_DBps and Hro_DBps. The maximum frequency is the highest frequency in the frequency response obtained by FFT. When the frame size of FFT is frame_size, the highest frequency can be calculated by (FS/frame_size)*(frame_size/2−1). Further, the amplitude level in each frequency band is adjusted by the gain value calculated in the first adjustment unit 907 or the second adjustment unit 911. Therefore, the frequency-amplitude characteristics are appropriately combined.

The second combining unit 912 outputs the second combined data Hls_com2 and Hro_com2 to the generation unit 920. The generation unit 920 generates filters F_Hls_U and F_Hro_U on the basis of the second combined data Hls_com2 and Hro_com2. For example, the generation unit 920 calculates the second combined data Hls_com2_Time and Hro_com2_Time in the time domain by performing inverse Fourier transform or the like on each of the second combined data Hls_com2 and Hro_com2. Note that the phase characteristics used in inverse Fourier transform may be those of the second set or of the preset data.

The generation unit 920 thereby calculates a direct sound part of the filters F_Hls_U and F_Hro_U. The generation unit 920 then combines the present data Hls_DBps with the second combined data Hls_com2_Time. Further, the generation unit 920 combines a reflected sound part of the preset data Hro_DBps to the second combined data Hro_com2_Time. For example, a direct sound part (i.e., 0 to X samples) of the filters F_Hls_U and F_Hro_U is the second combined data Hls_com2_Time and Hro_com2_Time. A reflected sound part ((X+1) to 4095 samples) is a part obtained by cutting out a reflected sound part ((X+1) to 4095 samples) of the preset data Hls_DBps and Hro_DBps in the time domain. Note that a reflected sound part of the filters F_Hls_U and F_Hro_U may be that of the preset data Hls_DBps and Hro_DBps or of the second set. For the preset data, it is preferred that the database 901 stores the first characteristic data in the time domain in advance.

By the above-described processing, the filter generation device 900 is able to generate the filters F_Hls_U and F_Hro_U. Further, by the similar processing, the filter generation device 900 is able to generate the filters F_Hlo_U and F_Hrs_U. Thus, even when the user U can only measure the ear canal transfer characteristics, the filters F_Hls_U, F_Hlo_U, F_Hro_U and F_Hrs_U suitable for the user U are generated.

Note that the values of the upper limit frequency and the lower limit frequency, the number of samples of a signal, the maximum frequency, and the minimum frequency of the first to third frequency bands in the above description are just examples, and those values are not particularly limited. Further, the order of processing of the first combining unit 908 and the second combining unit 912 is not particularly limited. For example, the characteristic data of the first set may be combined after the preset data and the first characteristic data of the second set are combined. Alternatively, the preset data, the first characteristic data of the second set, and the first characteristic data of the first set may be combined all together. Further, a power value may be used instead of the amplitude value in the frequency domain.

In the second embodiment, a user who performs out-of-head localization listening is not limited to a passenger of a vehicle such as an aircraft. Processing of the second embodiment is applicable when performing out-of-head localization in a user terminal owned by a user, such as a smartphone or a tablet terminal. Thus, identification information is not needed.

As described above, the filter generation device 900 according to the second embodiment includes the ear canal transfer characteristic acquisition unit 930, the first selection unit 902, the first acquisition unit 903, the second selection unit 904, the second acquisition unit 905, the third acquisition unit 906, and the generation unit 920. The ear canal transfer characteristic acquisition unit 930 acquires ear canal transfer characteristics from headphones or earphones worn on a user to a microphone. The first selection unit 902 refers to the database 901 that stores a plurality of sets of first characteristic data corresponding to spatial acoustic transfer characteristics from a speaker to the microphone and second characteristic data corresponding to ear canal transfer characteristics, and thereby selects a first set on the basis of a frequency response in a first frequency band of the ear canal transfer characteristics of the user. The first acquisition unit 903 acquires the second characteristic data contained in the first set selected by the first selection unit. The second selection unit 904 refers to the database 901 and thereby selects a second set on the basis of a frequency response in a second frequency band of the ear canal transfer characteristics of the user. The second acquisition unit 905 acquires the second characteristic data contained in the second set selected by the second selection unit 904. The third acquisition unit 906 acquires preset data that is set in advance. The generation unit 920 generates a filter appropriate to the spatial acoustic transfer characteristics of the user on the basis of the second characteristic data in the first set, the second characteristic data in the second set, and the preset data. The filter that allows performing appropriate processing is thereby generated.

Third Embodiment

In a third embodiment, out-of-head localization is performed using a 5.1ch reproduction signal. In the case of 5.1ch, there are six speakers. Specifically, in the measurement environment of the measurement device 200, a center speaker (front speaker), a front right speaker, a front left speaker, a rear right speaker, a rear left speaker, and a bass subwoofer speaker are located. Thus, the center speaker, the rear right speaker, the rear left speaker, and the bass subwoofer speaker are added to the measurement device 200 shown in FIG. 2. The center speaker is placed in front of the person 1 being measured. The center speaker is placed between the front left speaker and the front right speaker, for example.

The spatial acoustic transfer characteristics from the front left speaker to the left ear and the right ear are Hls and Hlo, respectively, just like in the first embodiment. The spatial acoustic transfer characteristics from the front right speaker to the left ear and the right ear are Hro and Hrs, respectively, just like in the first embodiment. The spatial acoustic transfer characteristics from the center speaker to the left ear and the right ear are CHl and CHr, respectively. The spatial acoustic transfer characteristics from the rear left speaker to the left ear and the right ear are SHls and SHlo, respectively. The spatial acoustic transfer characteristics from the rear right speaker to the left ear and the right ear are SHro and SHrs, respectively. The spatial acoustic transfer characteristics from the subwoofer speaker for bass output to the left ear and the right ear are SWHl and SWHr, respectively.

Thus, convolution calculation is performed using 12 filters corresponding to the spatial acoustic transfer characteristics Hls, Hlo, CHl, CHr, Hro, Hrs, SHls, SHlo, SHro, SHrs, SWHl, and SWHr. The filters corresponding to the spatial acoustic transfer characteristics Hls, Hlo, CHl, CHr, Hro, Hrs, SHls, SHlo, SHro, SHrs, SWHl, and SWHr are F_Hls, F_Hlo, F_CHl, F_CHr, F_Hro, F_Hrs, F_SHls, F_SHlo, F_SHro, F_SHrs, F_SWHl, and F_SWHr, respectively.

Figure 11:
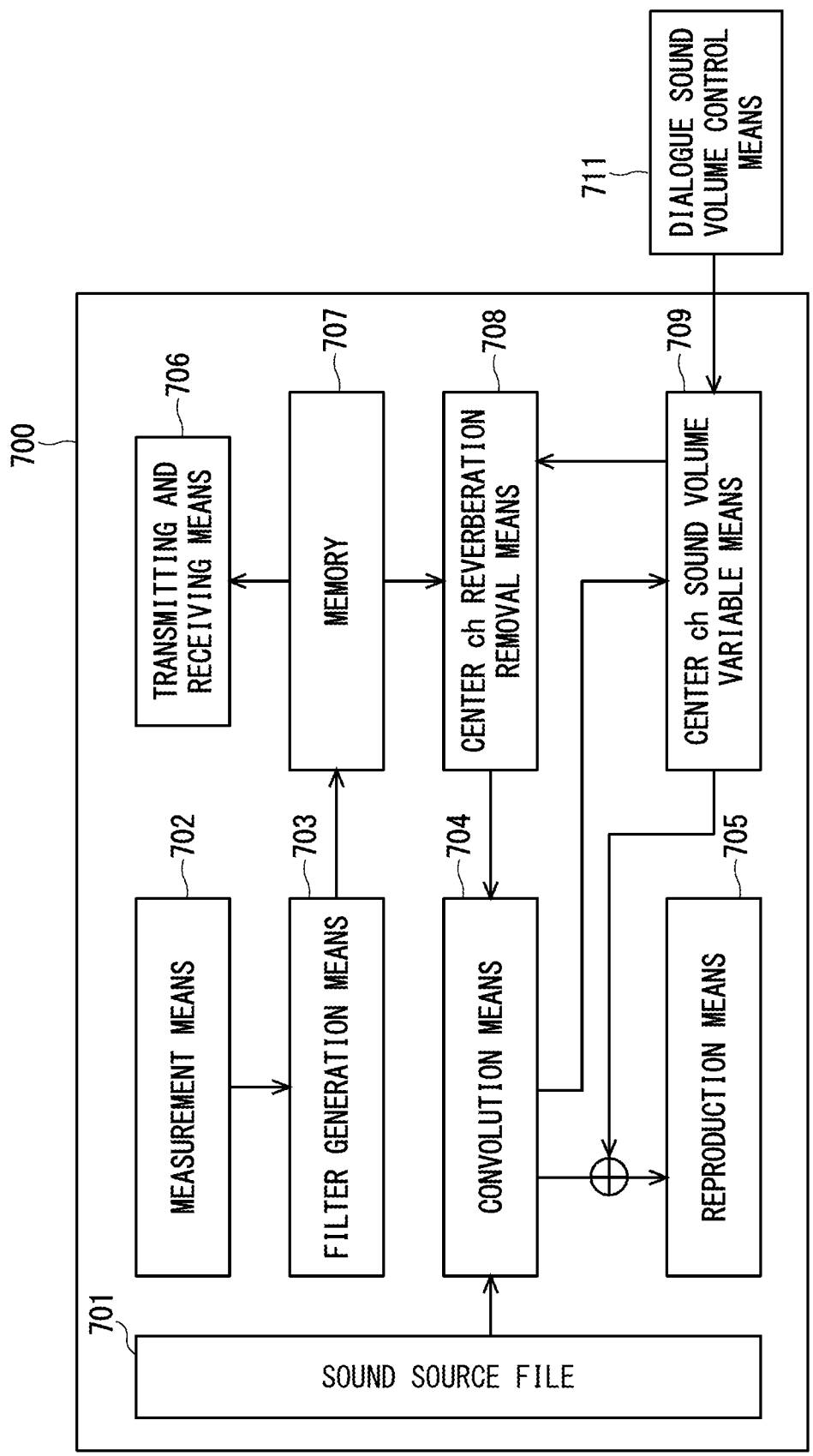
FIG. 11 is a block diagram showing the configuration of a processing device according to a third embodiment.

FIG. 11 is a block diagram showing the configuration of a processing device 700 according to this embodiment. The processing device 700 corresponds to the processing device 201 in FIG. 2, and it generates a filter. Further, the processing device 700 performs out-of-head localization as shown in FIG. 1. In this example, the processing device 700 performs convolution calculation by using the 12 filters F_Hls, F_Hlo, F_CHl, F_CHr, F_Hro, F_Hrs, F_SHls, F_SHlo, F_SHro, F_SHrs, F_SWHl, and F_SWHr. As a matter of course, a device that generates a filter and a device that performs out-of-head localization may be different devices.

The processing device 700 includes a sound source file 701, a measurement means 702, a filter generation means 703, a convolution means 704, a reproduction means 705, a transmitting and receiving means 706, a memory 707, a center ch reverberation removal means 708, and a center ch sound volume variable means 709. Further, a dialogue sound volume control means 711 is connected to the processing device 700.

The measurement means 702 measures spatial acoustic transfer characteristics. The measurement means 702 performs impulse measurement on each of the six speakers. To be specific, it outputs an impulse sound to each speaker, just like the measurement signal generation unit 211 shown in FIG. 2. Further, the measurement means 702, just like the sound pickup signal acquisition unit 212, acquires sound pickup signals from the microphones 2L and 2R.

The filter generation means 703, just like the filter generation unit 213, generates a filter on the basis of the sound pickup signals. Since measurement is performed using 6 speakers and 2 microphones in this example, 12 filters are generated. The memory 707 stores the 12 filters. The transmitting and receiving means 706 may transmit the filters to the server terminal 600 shown in FIG. 3, for example. The filters are thereby stored into the database.

When reproducing a 5.1ch reproduction signal, the user U is allowed to individually adjust the dialogue sound volume. Specifically, the sound volume of only the center speaker that outputs the sound signal of a dialogue is independently adjustable. The dialogue sound volume control means 711 receives input from the user U and controls the dialogue sound volume (the sound volume of the center ch). For example, the dialogue sound volume control means 711 displays a button or lever for volume adjustment. Then, the user U increases or decreases the dialogue sound volume depending on an out-of-head localization listening result. The dialogue sound volume control means 711 outputs a volume signal indicating a dialogue sound volume to the center ch sound volume variable means 709. The center ch sound volume variable means 709 includes a variable amplifier, and varies an amplification factor depending on input. As the sound signal, a numerical value of Vol indicating the sound volume or an amplification factor of the sound volume may be used.

The center ch reverberation removal means 708 performs processing to remove the reverberation of the center ch on the basis of the volume signal. In this example, the center ch reverberation removal means 708 performs windowing on the filters F_CHl and F_CHr of the center ch. The filters after windowing are F_WCHl and F_WCHr.

For example, when the sound volume of the center ch is equal to or higher than a threshold, the center ch reverberation removal means 708 performs windowing by using a window function that nulls the latter part of the filters F_CHl and F_CHr. This reduces noise to obtain a natural sound. Further, the center ch reverberation removal means 708 may use a window function that is constant up to a predetermined time and then gradually decreases after the predetermined time. The reduction of the reverberation of a dialogue part is achieved by using the filters F_WCHl and F_WCHr after windowing. Although there is no need to perform windowing when the sound volume is less than a threshold, it is assumed that windowing is done using a rectangular window for the sake of convenience.

Further, a window function may be varied depending on the dialogue sound volume. A window function whose window length becomes longer as the dialogue sound volume increases may be used. Alternatively, a window function whose window length becomes shorter as the dialogue sound volume increases may be used.

The sound source file 701 stores a 5.1ch reproduction signal. The 5.1ch reproduction signal is input to the convolution means 704. The convolution means 704 performs convolution calculation on the 6 reproduction signals by using the 12 filters.

Figure 12:
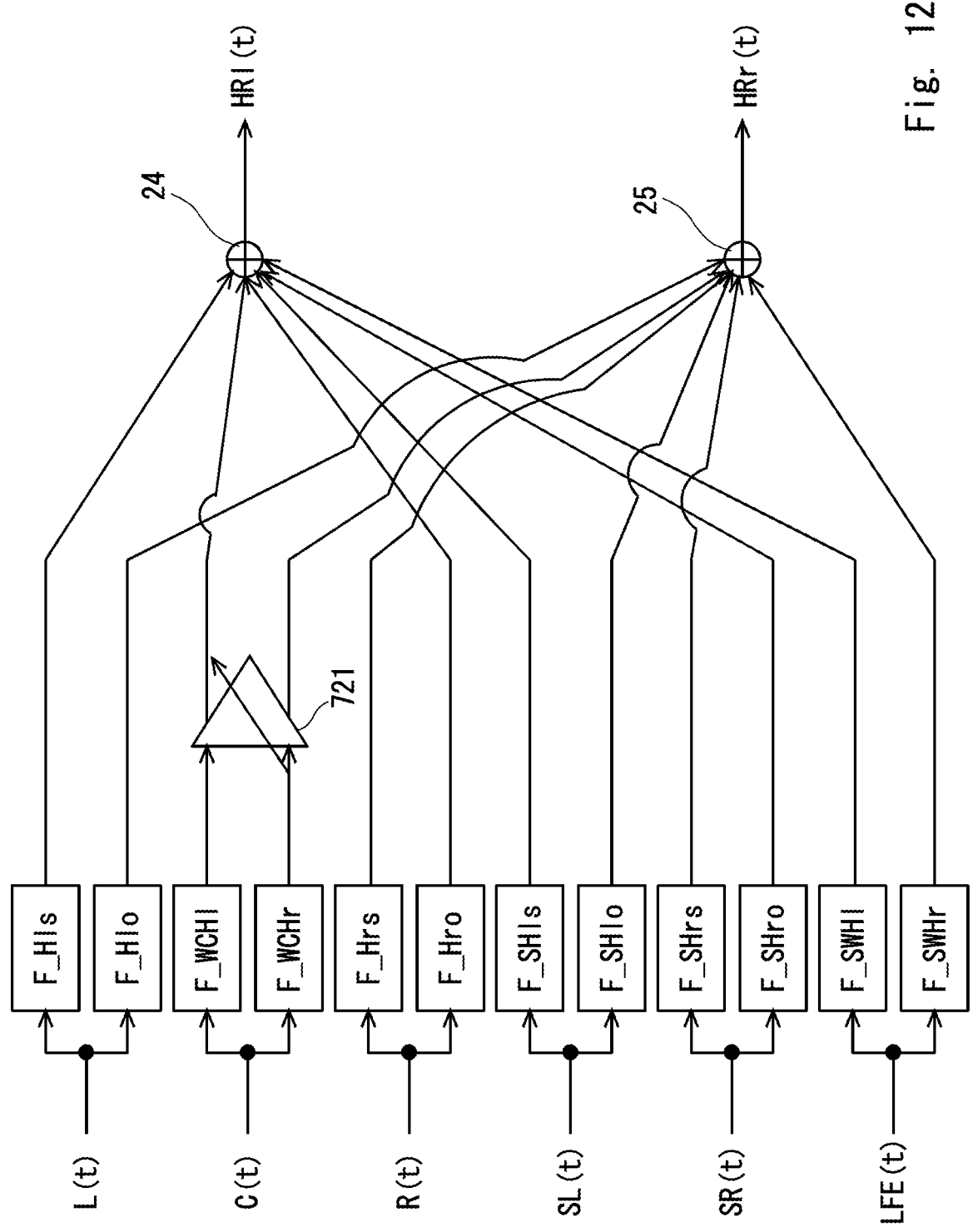
FIG. 12 is a view illustrating convolution processing by a 5.1ch reproduction signal and volume control.

The convolution means 704 performs convolution calculation using the filters F_Hls, F_Hlo, F_WCHl, F_WCHr, F_Hro, F_Hrs, F_SHls, F_SHlo, F_SHro, F_SHrs, F_SWHl, and F_SWHr. FIG. 12 is a view illustrating convolution calculation and dialogue sound volume control in the case of the 5.1ch reproduction signal.

A reproduction signal of the front left ch is L(t), a reproduction signal of the center ch is C(t), and a reproduction signal of the front right ch is R(t). A reproduction signal of the rear left ch is SL(t), a reproduction signal of the rear right ch is SR(t), and a reproduction signal of the subwoofer ch is LFE(t). Then, a corresponding filter is convolved to each reproduction signal. For example, the filters F_WCHl and F_WCHr are convolved to the reproduction signal C(t) of the center ch.

Then, the adder 24 adds 6 convolution signals to which the filters F_Hls, F_WCHl, F_Hro, F_SHls, F_SHro, and F_SWHl are convolved and thereby generates an addition signal HRl(t). The adder 24 outputs the addition signal HRl(t) to the filter unit 41 (see FIG. 1). The adder 25 adds convolution signals to which the filters F_Hlo, F_WCHr, F_Hrs, F_SHlo, F_SHrs, and F_SWHr are convolved and thereby generates an addition signal HRr(t). The adder 25 outputs the addition signal HRr(t) to the filter unit 42 (see FIG. 1). The reproduction means 705 convolves the inverse filters Linv and Rinv to the addition signal HRl(t) and HRr(t), respectively. Then, the addition signal HRl(t) and HRr(t) to which the inverse filters are convolved are output from the headphones 43.

The convolution signals to which the filters F_WCHl and F_WCHr are convolved are input to the adders 24 and 25 through a variable amplifier 721. The dialogue sound volume control means 711 changes an amplitude amplification factor of the variable amplifier 721 depending on the input sound volume. This allows adjusting the dialogue sound volume by the center ch according to the preference of the user U. Out-of-head localization is thereby performed appropriately.

Fourth Embodiment

In a fourth embodiment, in out-of-head localization listening, the out-of-head localization device 100 performs processing that allows a user to be more relaxed. For example, the out-of-head localization device 100 performs processing to sound like BGM (Back-Ground Music) by compressing the dynamic range of the filter or changing a method of supplying the reproduction signal.

Example 1

Figure 13:
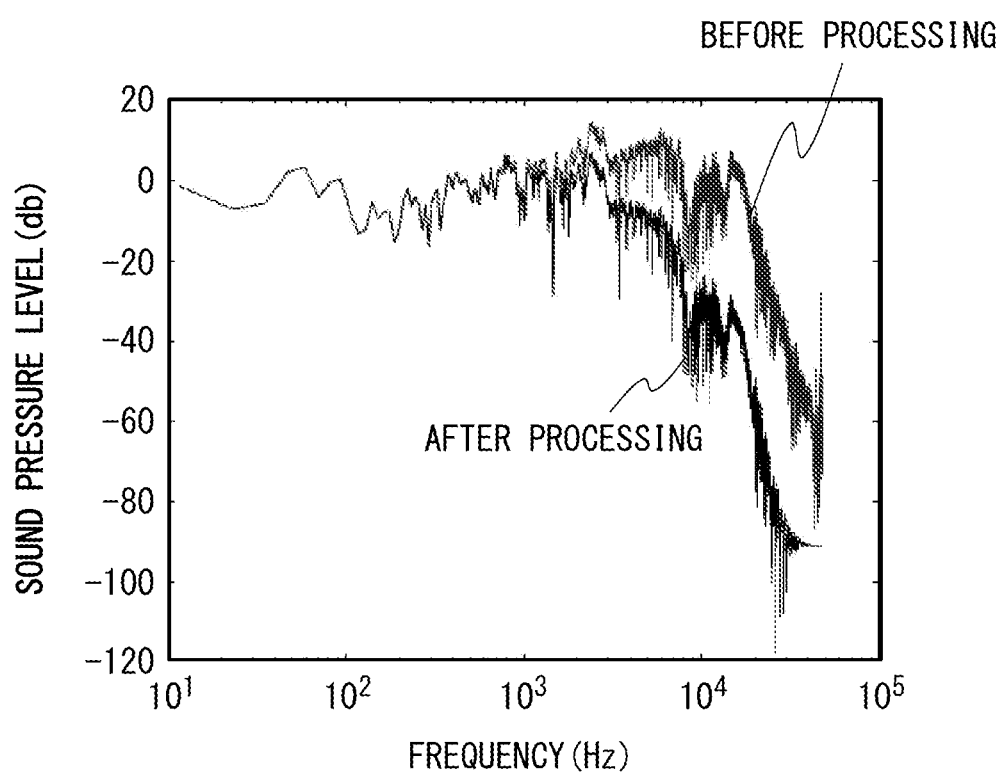
FIG. 13 is a view showing a filter before and after applying LPF in an example 1 of a fourth embodiment.

In an example 1, a filter is generated by compressing a high frequency band of the filter. To be specific, the filter generation device applies a low-pass filter (LPF) to each of the measured spatial acoustic transfer characteristics. For example, FIG. 13 shows an example in which an LPF with a cut-off frequency of 2 kHz is applied. FIG. 13 shows a sound pressure level before and after processing of applying the LPF to the filter F_Hls. By performing out-of-head localization using the filter to which the LPF is applied, the user U is more relaxed.

Example 2

Figure 14:
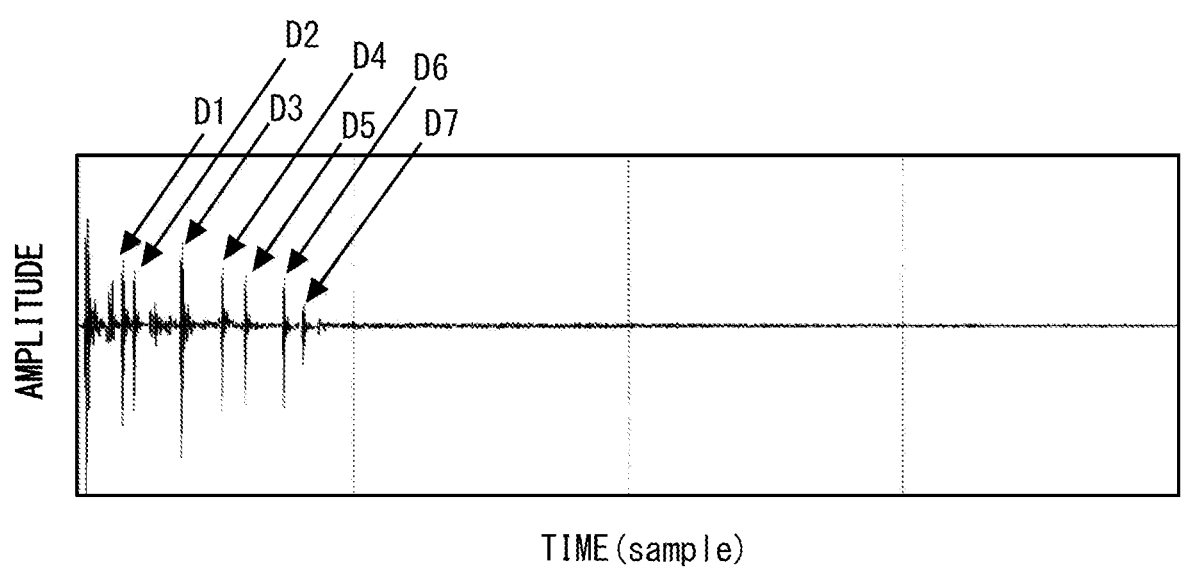
FIG. 14 is a view showing a filter to which a reverberation component is added in an example 2 of the fourth embodiment.

In an example 2, the filter generation device adds a signal where the amplitude of a direct sound is changed as a reverberation component in each filter. To be specific, the filter generation device cuts out a direct sound signal of the measured transfer characteristics, and adds a signal obtained by changing the amplitude of the direct sound signal as a reverberation component after the direct sound signal, and thereby generates a filter. FIG. 14 shows the filter F_Hls after reverberation components are added to the sound pickup signal shown in FIG. 10. In FIG. 10, seven reverberation components D1 to D7 are added. Each of the reverberation components is made by individually adjusting the amplitude of the direct sound signal. Note that the number of reverberation components to be added is not particularly limited. By performing out-of-head localization using this filter, the user U is more relaxed.

Note that, in FIGS. 1 to 4, FIG. 8, FIG. 11 and FIG. 12, some blocks may be omitted. In FIG. 2, the filter generation unit 213 may be placed in a device other than the processing device 201. Further, in the system 100 of FIG. 3, the display means 222, the communication means 223, the antenna 224 and the like may be omitted as appropriate. In the flowcharts of FIGS. 6 and 7, some or all of processing steps may be omitted. In FIG. 6, Steps S7 to S9 subsequent to Step S6 of trial listening may be omitted as appropriate. In FIG. 6, Steps S2 and S3 may be also omitted as appropriate. In FIG. 7, S13 to S16 may be omitted as appropriate.

A part or the whole of the above-described processing may be executed by a computer program. The above-described program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

Although embodiments of the invention made by the present invention are described in the foregoing, the present invention is not restricted to the above-described embodiments, and various changes and modifications may be made without departing from the scope of the invention.

The present disclosure is applicable to out-of-head localization.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An out-of-head localization system comprising:
   a measurement device configured to measure transfer characteristics by using a microphone worn on a user's ear before the user sits on a seat;
   an out-of-head localization device configured to perform out-of-head localization by using a filter appropriate to the transfer characteristics; and
   a server configured to transmit the filter appropriate to the transfer characteristics to the out-of-head localization device on a basis of identification information of the user,
   wherein ear canal transfer characteristics from headphones or earphones worn on the user to the microphone are measured,
   wherein, by referring to a database storing a plurality of sets of first characteristic data corresponding to spatial acoustic transfer characteristics from a speaker to the microphone and second characteristic data corresponding to the ear canal transfer characteristics, a filter appropriate to the spatial acoustic transfer characteristics of the user is acquired on a basis of the ear canal transfer characteristics of the user, and
   wherein by referring to the database:
      a first set is selected on a basis of a frequency response in a first frequency band of ear canal transfer characteristics of the user;
      a second set is selected on a basis of a frequency response in a second frequency band of ear canal transfer characteristics of the user;
      preset data set in advance is acquired; and
      the filter appropriate to the spatial acoustic transfer characteristics is generated on a basis of the second characteristic data contained in the first set, the second characteristic data contained in the second set, and the preset data.

2. The out-of-head localization system according to claim 1, wherein a plurality of seats including the seat and a plurality of out-of-head localization devices are installed in association with each other, and
   wherein the server identifies the seat by referring to the identification information, and transmits the filter to the out-of-head localization device corresponding to the identified seat.

3. The out-of-head localization system according to claim 1, wherein the system receives a payment from the user after a trial listening of the user.

4. The out-of-head localization system according to claim 1, wherein the filter appropriate to the transfer characteristics includes a center speaker filter with the spatial acoustic transfer characteristics from a center speaker to the microphone,
   wherein the system includes an input means for receiving input for adjusting a sound volume of the center speaker, and
   wherein windowing is performed on the center speaker filter by using a window function based on the sound volume.

5. The out-of-head localization system according to claim 1, wherein the filter appropriate to the transfer characteristics is generated by cutting out a direct sound part of the measured transfer characteristics and adding, after the direct sound part, a signal obtained by changing an amplitude of the direct sound part as a reverberation component.

6. An out-of-head localization method comprising:
   a step of measuring transfer characteristics by using a microphone worn on a user's ear before the user sits on a seat;
   a step of transmitting a filter appropriate to the transfer characteristics to an out-of-head localization device on a basis of identification information of the user;
   a step of performing, by an out-of-head localization device, out-of-head localization using the filter on a reproduction signal; and
   a step of outputting the reproduction signal on which the out-of-head localization is performed from headphones or earphones to the user corresponding to the identification information,
   wherein ear canal transfer characteristics from headphones or earphones worn on the user to the microphone are measured,
   wherein, by referring to a database storing a plurality of sets of first characteristic data corresponding to spatial acoustic transfer characteristics from a speaker to the microphone and second characteristic data corresponding to the ear canal transfer characteristics, a filter appropriate to the spatial acoustic transfer characteristics of the user is acquired on a basis of the ear canal transfer characteristics of the user, and wherein by referring to the database:
- a first set is selected on a basis of a frequency response in a first frequency band of ear canal transfer characteristics of the user;
- a second set is selected on a basis of a frequency response in a second frequency band of ear canal transfer characteristics of the user;
- preset data set in advance is acquired; and
- the filter appropriate to the spatial acoustic transfer characteristics is generated on a basis of the second characteristic data contained in the first set, the second characteristic data contained in the second set, and the preset data.

7. A filter generation device comprising:

an ear canal transfer characteristic acquisition unit configured to acquire ear canal transfer characteristics from headphones or earphones worn on a user to a microphone;

a processor coupled to a memory storing instructions, the processor being configured to:
- by referring to a database storing a plurality of sets of first characteristic data corresponding to spatial acoustic transfer characteristics from a speaker to the microphone and second characteristic data corresponding to the ear canal transfer characteristics, select a first set on a basis of a frequency response in a first frequency band of the ear canal transfer characteristics of the user;
- acquire the second characteristic data contained in the first set selected by the processor;
- by referring to the database, select a second set on a basis of a frequency response in a second frequency band of the ear canal transfer characteristics of the user;
- acquire the second characteristic data contained in the second set selected by the processor; and
- to acquire preset data set in advance; and a filter generation unit configured to generate a filter appropriate to spatial acoustic transfer characteristics of the user on a basis of the second characteristic data in the first set, the second characteristic data in the second set, and the preset data.

8. The filter generation device according to claim 7, wherein the processor generates combined data by combining the second characteristic data in the first set, the second characteristic data in the second set, and the preset data, wherein the processor generates the filter by converting the combined data into time domain, and wherein, in the combined data:
- an amplitude value or a power value of the first frequency band is set on a basis of the second characteristic data contained in the first set;
- an amplitude value or a power value of the second frequency band is set on a basis of the second characteristic data contained in the second set; and
- an amplitude value or a power value of a third frequency band lower than the first and second frequency bands is set on a basis of the preset data.

* * * * *